US012717271B2

(12) United States Patent
Sato et al.

(10) Patent No.: US 12,717,271 B2
(45) **Date of Patent: *Aug. 25, 2026**

(54) PROCESS CARTRIDGE, IMAGE FORMING APPARATUS AND TONER STORAGE UNIT

(71) Applicant: BROTHER KOGYO KABUSHIKI KAISHA, Nagoya (JP)

(72) Inventors: Shougo Sato, Seto (JP); Yasutada Kato, Nagoya (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,260

(22) Filed: Dec. 19, 2024

(65) Prior Publication Data

US 2025/0130526 A1 Apr. 24, 2025

Related U.S. Application Data

(63) Continuation of application No. 18/048,097, filed on Oct. 20, 2022, now Pat. No. 12,210,313.

(30) Foreign Application Priority Data

Nov. 1, 2021 (JP) ................................. 2021-179077
Nov. 1, 2021 (JP) ................................. 2021-179078

(51) Int. Cl.
*G03G 21/18* (2006.01)
*G03G 15/08* (2006.01)
(Continued)

(52) U.S. Cl.
CPC ..... *G03G 21/1814* (2013.01); *G03G 15/0808* (2013.01); *G03G 15/087* (2013.01);
(Continued)

(58) Field of Classification Search
None
See application file for complete search history.

(56) References Cited

U.S. PATENT DOCUMENTS 4,470,689 A 9/1984 Nomura et al.
5,419,468 A 5/1995 Taki
(Continued)

FOREIGN PATENT DOCUMENTS

JP 59-147375 A 8/1984
JP 2-62563 U 5/1990
(Continued)

*Primary Examiner* — Sevan A Aydin
(74) *Attorney, Agent, or Firm* — Merchant & Gould P.C.

(57) ABSTRACT

A process cartridge mountable on an image forming apparatus includes a photoconductive drum, a developing unit including a developing roller and a toner storage unit. The toner storage includes a first toner storage chamber, a second toner storage chamber located above the first toner storage chamber, a first toner conveying member located in the first toner storage chamber and configured to convey the toner in the first toner storage chamber upward toward the second toner storage chamber in an area wider than the toner discharge outlet in the first direction, and a second toner conveying member located in the second toner storage chamber and configured to convey, in the first direction, the toner in the second toner storage chamber toward the toner discharge outlet.

14 Claims, 14 Drawing Sheets

(51) Int. Cl.
*G03G 21/00* (2006.01)
*G03G 21/16* (2006.01)

(52) U.S. Cl.
CPC ....... *G03G 21/007* (2013.01); *G03G 21/1676* (2013.01); *G03G 2215/0663* (2013.01); *G03G 2215/083* (2013.01); *G03G 2215/1657* (2013.01)

(56) References Cited

U.S. PATENT DOCUMENTS

| | | | | |
|---|---|---|---|---|
| 5,722,002 | A | 2/1998 | Kikuta et al. | |
| 2003/0012589 | A1 | 1/2003 | Kanari et al. | |
| 2007/0160380 | A1* | 7/2007 | Imaizumi | G03G 21/1842 399/90 |
| 2008/0205927 | A1 | 8/2008 | Linton et al. | |
| 2008/0213005 | A1* | 9/2008 | Kobayashi | G03G 15/0865 399/262 |
| 2008/0247784 | A1 | 10/2008 | Kakuta et al. | |
| 2009/0028600 | A1* | 1/2009 | Oda | G03G 15/0872 399/106 |
| 2009/0142092 | A1 | 6/2009 | Sato | |
| 2009/0274491 | A1 | 11/2009 | Sato | |
| 2010/0202803 | A1 | 8/2010 | Sato et al. | |
| 2010/0272474 | A1 | 10/2010 | Sato | |
| 2010/0303499 | A1 | 12/2010 | Mori et al. | |
| 2011/0103844 | A1 | 5/2011 | Sato | |
| 2011/0217068 | A1* | 9/2011 | Kamimura | G03G 15/0872 399/119 |
| 2011/0217069 | A1* | 9/2011 | Imai | G03G 15/0865 399/119 |
| 2012/0003000 | A1* | 1/2012 | Nishiyama | G03G 15/0896 399/119 |
| 2013/0223889 | A1 | 8/2013 | Kato | |
| 2014/0016959 | A1 | 1/2014 | Uno | |
| 2015/0125175 | A1 | 5/2015 | Fujii | |
| 2015/0139690 | A1 | 5/2015 | Kim et al. | |
| 2015/0220018 | A1 | 8/2015 | Nanno | |
| 2016/0091858 | A1 | 3/2016 | Shiraki et al. | |
| 2018/0136586 | A1 | 5/2018 | Tsuchiya et al. | |
| 2021/0003964 | A1* | 1/2021 | Sato | G03G 21/1817 |
| 2021/0141335 | A1* | 5/2021 | Maeta | G03G 21/1842 |
| 2021/0191311 | A1* | 6/2021 | Sato | G03G 21/1842 |
| 2022/0011716 | A1* | 1/2022 | Sato | G03G 21/1842 |
| 2022/0100123 | A1 | 3/2022 | Sato et al. | |
| 2022/0107603 | A1 | 4/2022 | Sato et al. | |

FOREIGN PATENT DOCUMENTS

| | | | |
|---|---|---|---|
| JP | 6-35322 | A | 9/1994 |
| JP | 2003-29532 | A | 1/2003 |
| JP | 2008-170951 | A | 7/2008 |
| JP | 2009-265537 | A | 11/2009 |
| JP | 2010-256806 | A | 11/2010 |
| JP | 2011-95578 | A | 5/2011 |
| JP | 2013-178413 | A | 9/2013 |
| JP | 2014-21132 | A | 2/2014 |

* cited by examiner

PROCESS CARTRIDGE, IMAGE FORMING APPARATUS AND TONER STORAGE UNIT

REFERENCE TO RELATED APPLICATIONS

The present application is a continuation of U.S. patent application Ser. No. 18/048,097 filed Oct. 20, 2022, now U.S. Pat. No. 12,210,313, which claims priority from Japanese Patent Application No. 2021-179077 and No. 2021-179078, which were filed on Nov. 1, 2021, the disclosures of which are herein incorporated by reference in their entirety.

BACKGROUND ART

The following disclosure relates to a process cartridge, an image forming apparatus and a toner storage unit.

There has been known a conventional cartridge mounted on an image forming apparatus in which toner in a toner storage unit is conveyed upward toward an upper part of the toner storage unit.

DESCRIPTION

In the above described cartridge, there is a possibility that a sufficient amount of toner is not conveyed from the toner storage unit to a developing unit.

An aspect of the disclosure relates to a process cartridge, an image forming apparatus and a toner storage unit capable of conveying a sufficient amount of toner from a toner storage unit to a developing unit.

In one aspect of the disclosure, a process cartridge mountable on an image forming apparatus includes a photoconductive drum rotatable around a drum axis extending in a first direction, a developing unit including a developing roller configured to supply toner to the photoconductive drum, and a developer housing supporting the developing roller and capable of storing toner, the developer housing having a developer inlet through which toner is received, and a toner storage unit. The toner storage unit includes a first toner storage chamber capable of storing toner, a second toner storage chamber located above the first toner storage chamber in the state in which the process cartridge is mounted on the image forming apparatus, the second toner storage chamber having a toner discharge outlet through which toner is discharged toward the developer inlet, a first toner conveying member located in the first toner storage chamber and configured to convey the toner in the first toner storage chamber upward toward the second toner storage chamber in an area wider than the toner discharge outlet in the first direction, and a second toner conveying member located in the second toner storage chamber and configured to convey, in the first direction, the toner in the second toner storage chamber toward the toner discharge outlet.

In another aspect of the disclosure, an image forming apparatus includes a body housing having an opening, a drawer movable through the opening between an accommodated position at which the drawer is accommodated in the body housing and a drawn position at which the drawer is drawn to a position outside the body housing, a drum cartridge including a photoconductive drum and a developing unit configured to supply toner to the photoconductive drum, the drum cartridge being mounted on the drawer, and a toner storage unit mounted on the drum cartridge and capable of storing toner to be supplied to the developing unit. The toner storage unit includes a lock member movable between a lock position at which the lock member locks the toner storage unit to the drum cartridge and a lock release position at which a lock between the toner storage unit and the drum cartridge is released in the state in which the toner storage unit is mounted on the drum cartridge, the lock member including a lock grip. The lock grip is located at a position lower than an upper end of the toner storage unit in a state in which (i) the toner storage unit is mounted on the drum cartridge, (ii) the lock member is positioned at the lock position, (iii) the drum cartridge is mounted on the drawer, and (iv) the drawer is positioned at the accommodated position.

In another aspect of the disclosure, an image forming apparatus includes a body housing having an opening, a drawer movable through the opening between an accommodated position at which the drawer is accommodated in the body housing and a drawn position at which the drawer is drawn to a position outside the body housing, a first drum cartridge including a first photoconductive drum and a first developing unit configured to supply toner to the first photoconductive drum, the first drum cartridge being mounted on the drawer, a first toner storage unit mounted on the first drum cartridge and capable of storing toner to be supplied to the first developing unit, a second drum cartridge including a second photoconductive drum and a second developing unit configured to supply toner to the second photoconductive drum, the second drum cartridge being mounted on the drawer, a second toner storage unit mounted on the second drum cartridge and capable of storing toner to be supplied to the second developing unit. The first toner storage unit includes a lock member movable between a lock position at which the lock member locks the first toner storage unit to the first drum cartridge and a lock release position at which a lock between the first toner storage unit and the first drum cartridge is released in a state in which the first toner storage unit is mounted on the first drum cartridge, the lock member including a lock grip. The lock member is located between the first toner storage unit and the second drum cartridge in a state in which (i) the first toner storage unit is mounted on the first drum cartridge, (ii) the lock member is positioned at the lock position, and (iii) the first drum cartridge and the second drum cartridge are mounted on the drawer.

The objects, features, advantages, and technical and industrial significance of the present disclosure will be better understood by reading the following detailed description of the embodiments, when considered in connection with the accompanying drawings, in which:

FIG. 1 is a plan view of a printer.

IMAGE FORMING APPARATUS

There will be described an image forming apparatus with reference to FIG. 1 and FIG. 2.

Figure 1:
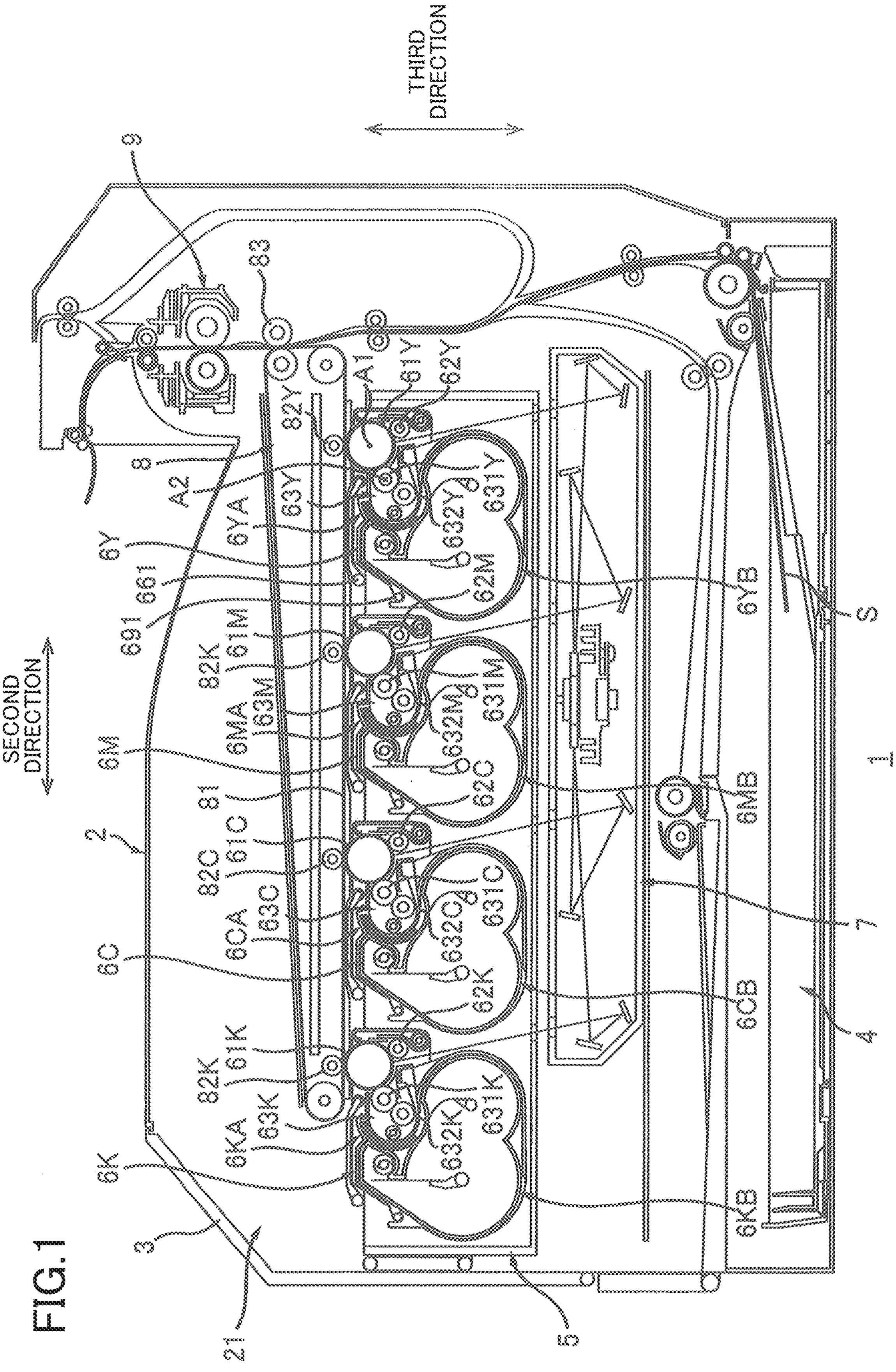
FIG. 1 is a schematic view of an image forming apparatus.

As illustrated in FIG. 1, the image forming apparatus 1 includes a body housing 2, a cover 3, a sheet cassette 4, a drawer 5, a plurality of process cartridges 6Y, 6M, 6C, 6K, an exposing unit 7, a transfer unit 8 and a fixing unit 9.

Body Housing

The body housing 2 accommodates the sheet cassette 4, the drawer 5, the plurality of process cartridges 6Y, 6M, 6C, 6K, the exposing unit 7, the transfer unit 8 and the fixing unit 9. The body housing 2 includes an opening 21, as illustrated in FIG. 2.

Cover

Figure 2:
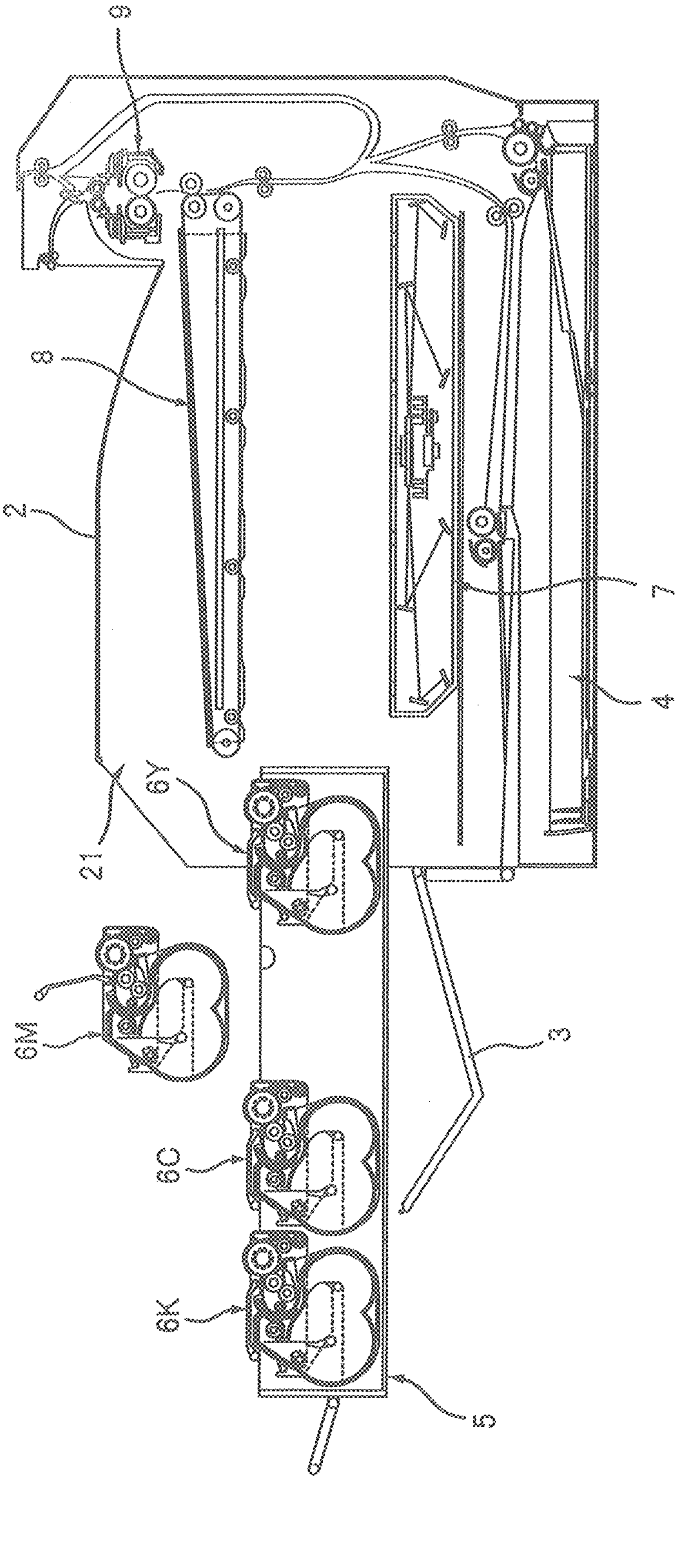
FIG. 2 is a view for explaining a movement of a drawer illustrated in FIG. 1.

As illustrated in FIG. 1 and FIG. 2, the cover 3 is movable between a closed position (see FIG. 1) and an open position (see FIG. 2). As illustrated in FIG. 1, in a state in which the cover 3 is positioned at the closed position, the cover 3 closes the opening 21. As illustrated in FIG. 2, in a state in which the cover 3 is positioned at the open position, the opening 21 is open.

Sheet Cassette

As illustrated in FIG. 1, the sheet cassette 4 is capable of storing a sheet S. The sheet S stored in the sheet cassette 4 is conveyed toward a secondary transfer roller 83. The secondary transfer roller 83 will be described below.

Drawer

As illustrated in FIG. 1 and FIG. 2, in the state in which the cover 3 is positioned at the open position, the drawer 5 is movable through the opening 21 between an accommodated position (see FIG. 1) and a drawn position (see FIG. 2). As illustrated in FIG. 1, in a state in which the drawer 5 is positioned at the accommodated position, the drawer 5 is accommodated in the body housing 2. As illustrated in FIG. 2, in a state in which the drawer 5 is positioned at the drawn position, the drawer 5 is drawn to a position outside the body housing 2.

Process Cartridge

As illustrated in FIG. 1, each of the plurality of process cartridges 6Y, 6M, 6C, 6K is mountable on the image forming apparatus 1. Each of the plurality of process cartridges 6Y, 6M, 6C, 6K is mountable in the body housing 2. The plurality of process cartridges 6Y, 6M, 6C, 6K are arranged in a direction in which the drawer 5 moves.

The process cartridge 6Y includes a drum cartridge 6YA and a toner storage unit 6YB. In other words, the image forming apparatus 1 includes the drum cartridge 6YA and the toner storage unit 6YB.

It is noted that each of the process cartridges 6M, 6C, 6K is explained in the same manner as the process cartridge 6Y. That is, the process cartridge 6M includes a drum cartridge 6MA and a toner storage unit 6MB. In other words, the image forming apparatus 1 includes the drum cartridges 6YA, 6MA and the toner storage units 6YB, 6MB. An explanation of each of the process cartridges 6M, 6C, 6K is dispensed with.

Drum Cartridge

The drum cartridge 6YA is mounted on the drawer 5. The drum cartridge 6YA includes a photoconductive drum 61Y, a charging unit 62Y and a developing unit 63Y. In other words, the process cartridge 6Y includes the photoconductive drum 61Y, the charging unit 62Y and the developing unit 63Y.

It is noted that each of the drum cartridges 6MA, 6CA, 6KA is explained in the same manner as the drum cartridge 6YA. That is, the drum cartridge 6MA includes a photoconductive drum 61M and a developing unit 63M. The drum cartridge 6MA is mounted on the drawer 5. The developing unit 63M is capable of supplying toner to the photoconductive drum 61M. An explanation of each of the drum cartridges 6MA, 6CA, 6KA is dispensed with.

Photoconductive Drum

The photoconductive drum 61Y extends in a first direction. The photoconductive drum 61Y has a cylindrical shape. The photoconductive drum 61Y is rotatable around a drum axis A1. The drum axis A1 extends in the first direction. In a state in which the process cartridge 6Y is mounted on the image forming apparatus 1, the photoconductive drum 61Y is located below the transfer unit 8.

Charging Unit

The charging unit 62Y charges a circumferential surface of the photoconductive drum 61Y. Specifically, the charging unit 62Y is a charging roller. It is noted that the charging unit 62Y may be a scorotron type charging unit.

Developing Unit

The developing unit 63Y is capable of supplying toner to the photoconductive drum 61Y. The developing unit 63Y includes a developing roller 631Y and a developer housing 632Y.

The developing roller 631Y is capable of supplying the toner in the developer housing 632Y to the photoconductive drum 61Y. The developing roller 631Y is in contact with the photoconductive drum 61Y. The developing roller 631Y may be configured such that the developing roller 631Y is capable of being apart from the photoconductive drum 61Y. The developing roller 631Y extends in the first direction. The developing roller 631Y includes a column shape. The developing roller 631Y is rotatable around a developer axis A2. The developer axis A2 extends in the first direction.

The developer housing 632Y supports the developing roller 631Y. The developer housing 632Y is capable of storing toner supplied from the toner storage unit 6YB.

Toner Storage Unit

The toner storage unit 6YB is capable of storing toner which is toner to be supplied to the developing unit 63Y. The toner storage unit 6YB is mounted on the drum cartridge 6YA. More specifically, the toner storage unit 6YB is a toner cartridge mountable on and removable from the developing unit 63Y.

It is noted that each of the toner storage units 6MB, 6CB, 6KB is explained in the same manner as the toner storage unit 6YB. That is, the toner storage unit 6MB is capable of storing the toner which is to be supplied to the developing unit 63M. The toner storage unit 6MB is mounted on the drum cartridge 6MA. An explanation of each of the toner storage units 6MB, 6CB, 6KB is dispensed with.

Exposing Unit

The exposing unit 7 is capable of exposing a surface of the photoconductive drum 61Y charged by the charging unit 62Y, a surface of the photoconductive drum 61M charged by a charging unit 62M, a surface of a photoconductive drum 61C charged by a charging unit 62C, and a surface of a photoconductive drum 61K charged by a charging unit 62K.

In the present embodiment, the exposing unit 7 is a laser scanning unit. The exposing unit 7 may be a LED array.

In a state in which the plurality of process cartridges 6Y, 6M, 6C, 6K are mounted on the drawer 5 and the drawer 5 is positioned at the accommodated position, the exposing unit 7 is located below the plurality of process cartridges 6Y, 6M, 6C, 6K.

Transfer Unit

In a state in which the drum cartridge 6YA, 6MA, 6CA, 6KA are mounted on the drawer 5 and the drawer 5 is positioned at the accommodated position, the transfer unit 8 is located above the photoconductive drums 61Y, 61M, 61C, 61K. The transfer unit 8 transfers toner images formed on the photoconductive drums 61Y, 61M, 61C, 61K onto the sheet S.

The transfer unit 8 includes an intermediate transfer belt 81, a plurality of primary transfer rollers 82Y, 82M, 82C, 82K and the secondary transfer roller 83.

Intermediate Transfer Belt

In a state in which the drum cartridge 6YA, 6MA, 6CA, 6KA are mounted on the drawer 5, the drawer 5 is positioned at the accommodated position and the cover 3 is positioned at the closed position, the intermediate transfer belt 81 comes into contact with the photoconductive drums 61Y, 61M, 61C, 61K. In the state in which the drum cartridge 6YA, 6MA, 6CA, 6KA are mounted on the drawer 5 and the drawer 5 is positioned at the accommodated position, the intermediate transfer belt 81 passes through between the photoconductive drum 61Y and the primary transfer roller 82Y, between the photoconductive drum 61M and the primary transfer roller 82M, between the photoconductive drum 61C and the primary transfer roller 82C and between the photoconductive drum 61K and the primary transfer roller 82K.

Primary Transfer Roller

The primary transfer roller 82Y transfers a toner image formed on the photoconductive drum 61Y onto the intermediate transfer belt 81. The primary transfer roller 82M transfers a toner image formed on the photoconductive drum 61K onto the intermediate transfer belt 81. The primary transfer roller 82C transfers a toner image formed on the photoconductive drum 61C onto the intermediate transfer belt 81. The primary transfer roller 82K transfers a toner image formed on the photoconductive drum 61K onto the intermediate transfer belt 81.

Secondary Transfer Roller

The secondary transfer roller 83 is in contact with the intermediate transfer belt 81. The sheet S conveyed from the sheet cassette 4 passes through between the intermediate transfer belt 81 and the secondary transfer roller 83. When the sheet S passes through between the intermediate transfer belt 81 and the secondary transfer roller 83, the secondary transfer roller 83 transfers the toner image having been transferred to the intermediate transfer belt 81 onto the sheet S.

Fixing Unit

The fixing unit 9 fixes the toner image onto the sheet S by heating and pressing the sheet S on which the toner image is transferred. The sheet S having passed through the fixing unit 9 is discharged to an upper surface of the body housing 2.

Detail of Process Cartridge

There will be described the process cartridge 6Y in detail with reference to FIG. 3 to FIG. 12.

Drum Cartridge

Figure 3:
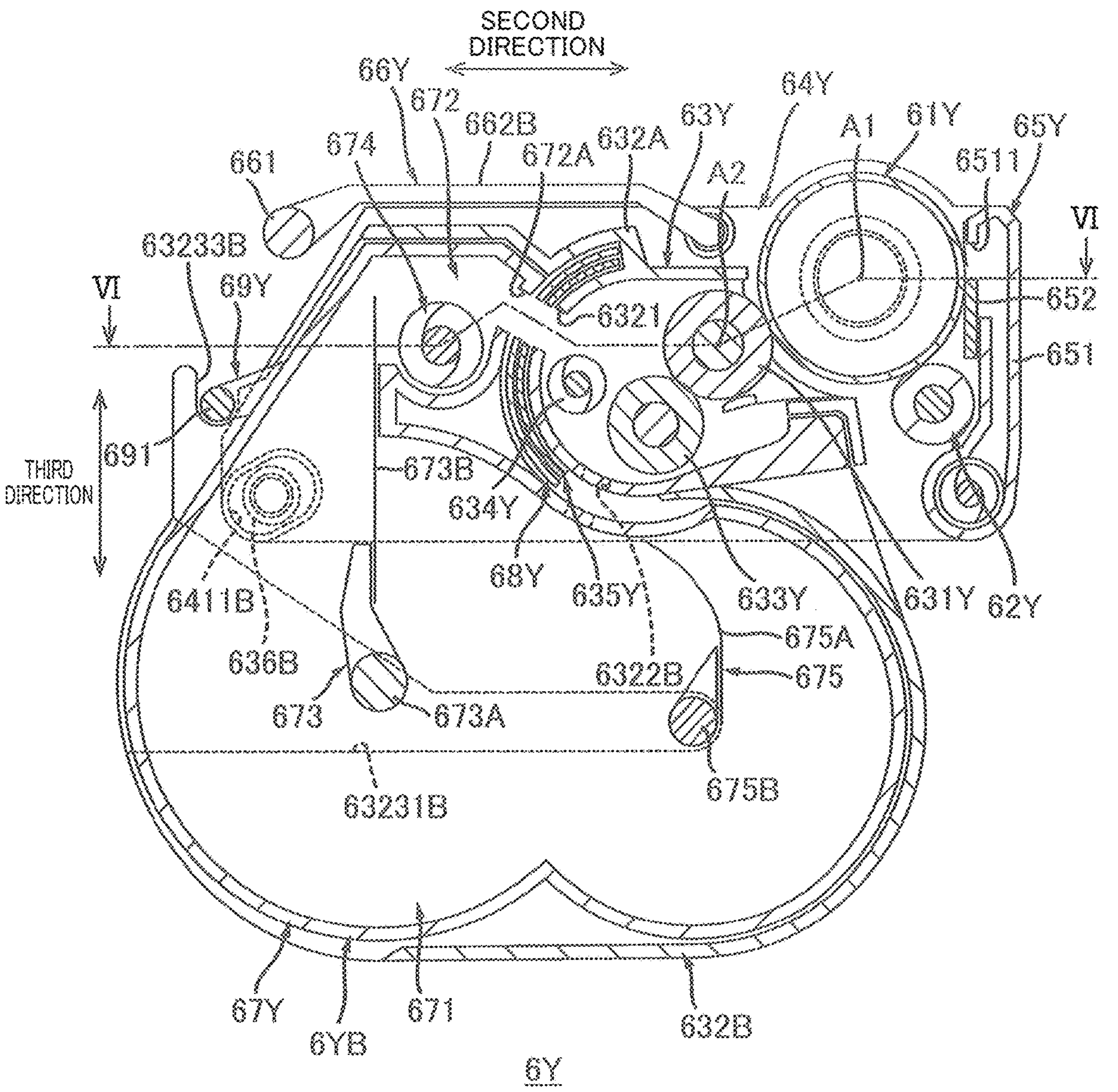
FIG. 3 is a view for explaining a process cartridge illustrated in FIG. 1.

As illustrated in FIG. 3, the drum cartridge 6YA includes a drum frame 64Y, a drum cleaner 65Y and a handle 66Y in addition to the photoconductive drum 61Y, the charging unit 62Y and the developing unit 63Y which are described above. In other words, the process cartridge 6Y includes the drum cleaner 65Y.

Drum Frame

Figure 4:
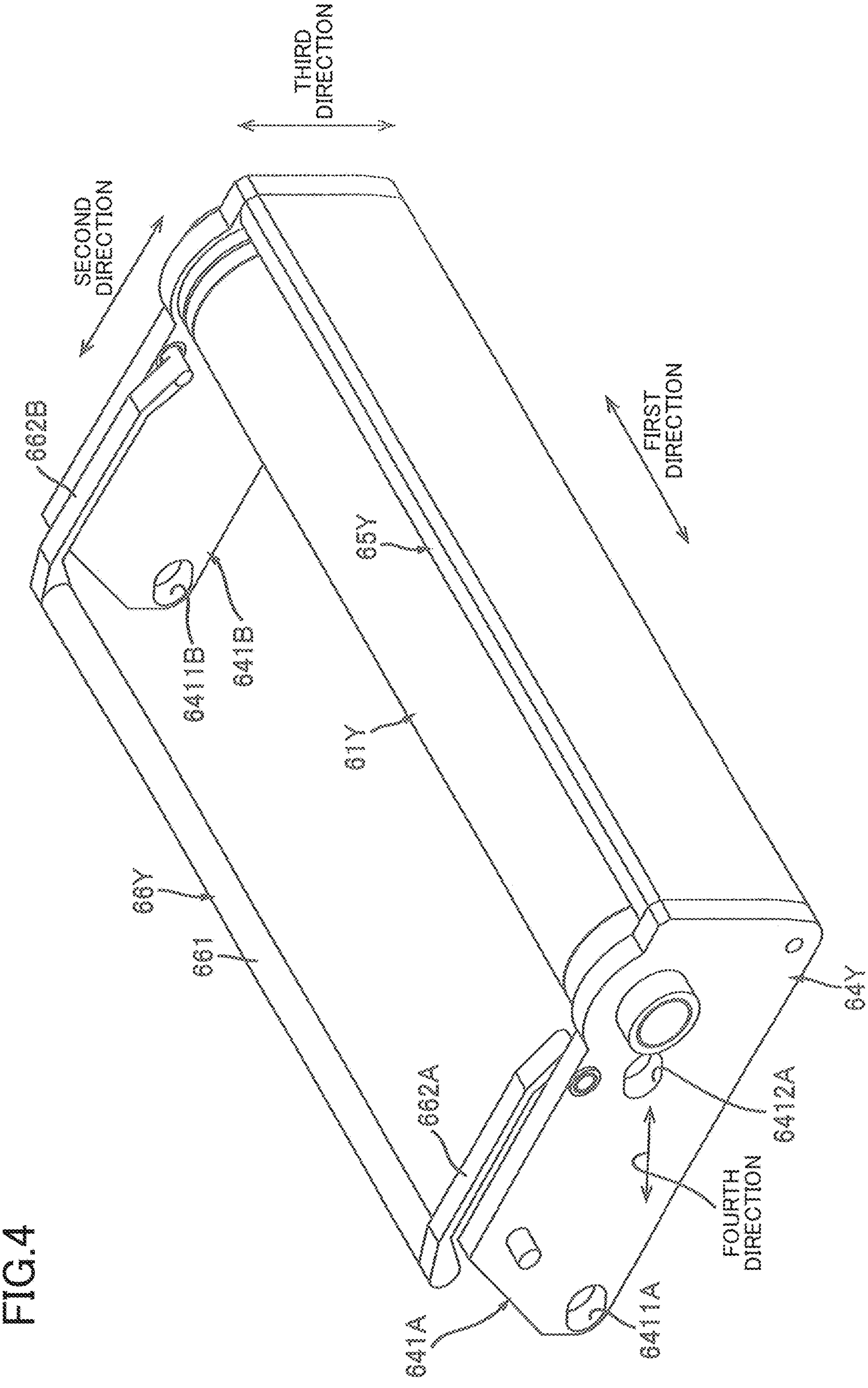
FIG. 4 is a drum frame illustrated in FIG. 3.

As illustrated in FIG. 4, the drum frame 64Y includes two drum side plates 641A, 641B.

The drum side plate 641A is located at a first end of the drum frame 64Y in the first direction. The drum side plate 641A supports a first end of the photoconductive drum 61Y in the first direction. The drum side plate 641A includes a hole 6411A and a hole 6412A. The drum side plate 641A extends in a second direction and a third direction.

In a state in which the image forming apparatus 1 is placed on a horizontal plane and the process cartridge 6Y is mounted on the image forming apparatus 1, the second direction is a horizontal direction. The second direction intersects the first direction. It is preferable that the second direction is orthogonal to the first direction. In the state in which the image forming apparatus 1 is placed on the horizontal plane and the process cartridge 6Y is mounted on the image forming apparatus 1, the third direction is an up and down direction. The third direction intersects each of the first direction and the second direction. It is preferable that the third direction is orthogonal to each of the first direction and the second direction.

The hole 6411A is spaced apart from the photoconductive drum 61Y in a fourth direction. The fourth direction is a direction directed from a position of the drum axis A1 in FIG. 3 to a position of the developer axis A2 in FIG. 3. The hole 6411A is an elongated hole. The hole 6411A extends in the fourth direction.

The hole 6412A is located between the photoconductive drum 61Y and the hole 6411A in the fourth direction. The hole 6412A is an elongated hole. The hole 6412A extends in the fourth direction.

The drum side plate 641B is located at a second end of the drum frame 64Y in the first direction. The drum side plate 641B supports a second end of the photoconductive drum 61Y in the first direction. The drum side plate 641B includes a hole 6411B and a hole 6412B, which is not illustrated. The drum side plate 641B extends in the second direction and the third direction.

The hole 6411B is spaced apart from the photoconductive drum 61Y in the fourth direction. The hole 6411B is an elongated hole. The hole 6411B extends in the fourth direction.

The hole 6412B is located between the photoconductive drum 61Y and the hole 6411B in the fourth direction. The hole 6412B is an elongated hole. The hole 6412B extends in the fourth direction.

Detail of Developing Unit

As illustrated in FIG. 3, the developing unit 63Y includes a supplying roller 633Y, a toner conveying member 634Y, a developer shutter 635Y, two protrusions 636A, 637A (see FIG. 5) and two protrusions 636B, 637B (see FIG. 5) in addition to the developing roller 631Y and the developer housing 632Y, which are described above.

Detail of Developer Housing

Figure 5:
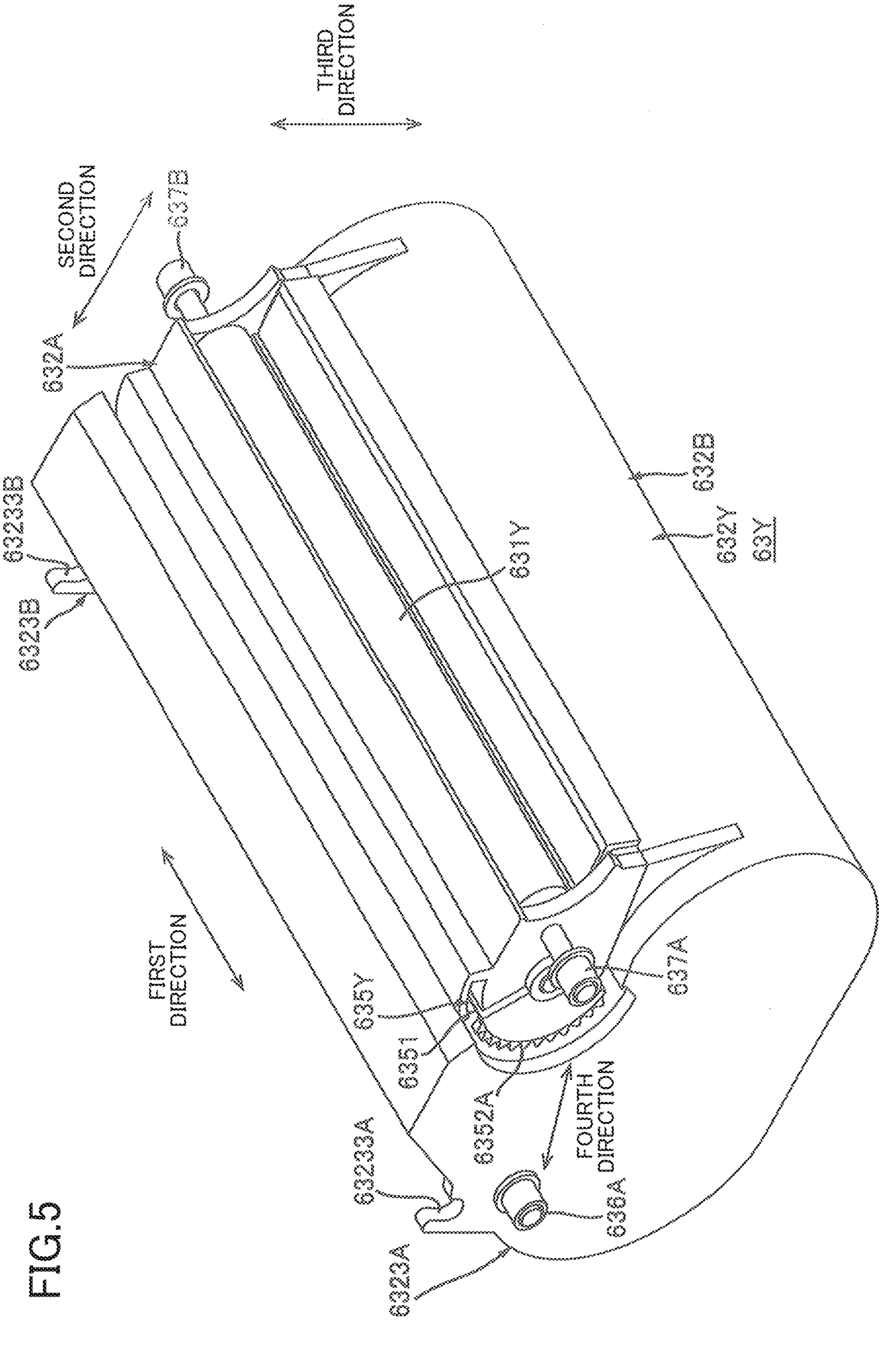
FIG. 5 is a perspective view of a developing unit illustrated in FIG. 3.

As illustrated in FIG. 3 and FIG. 5, the developer housing 632Y includes a first frame 632A and a second frame 632B.

First Frame

The first frame 632A supports the developing roller 631Y. The first frame 632A accommodates the supplying roller 633Y and the toner conveying member 634Y. In a state in which the toner storage unit 6YB is mounted on the drum cartridge 6YA, the first frame 632A is capable of storing the toner conveyed from the toner storage unit 6YB. The first frame 632A extends in the first direction. The first frame 632A has a tubular shape. As illustrated in FIG. 3, the first frame 632A includes a developer inlet 6321 and two developer discharge outlets 6322A, 6322B (see in FIG. 6). In other words, the developer housing 632Y includes the developer inlet 6321 and the two developer discharge outlets 6322A, 6322B.

Figure 6:
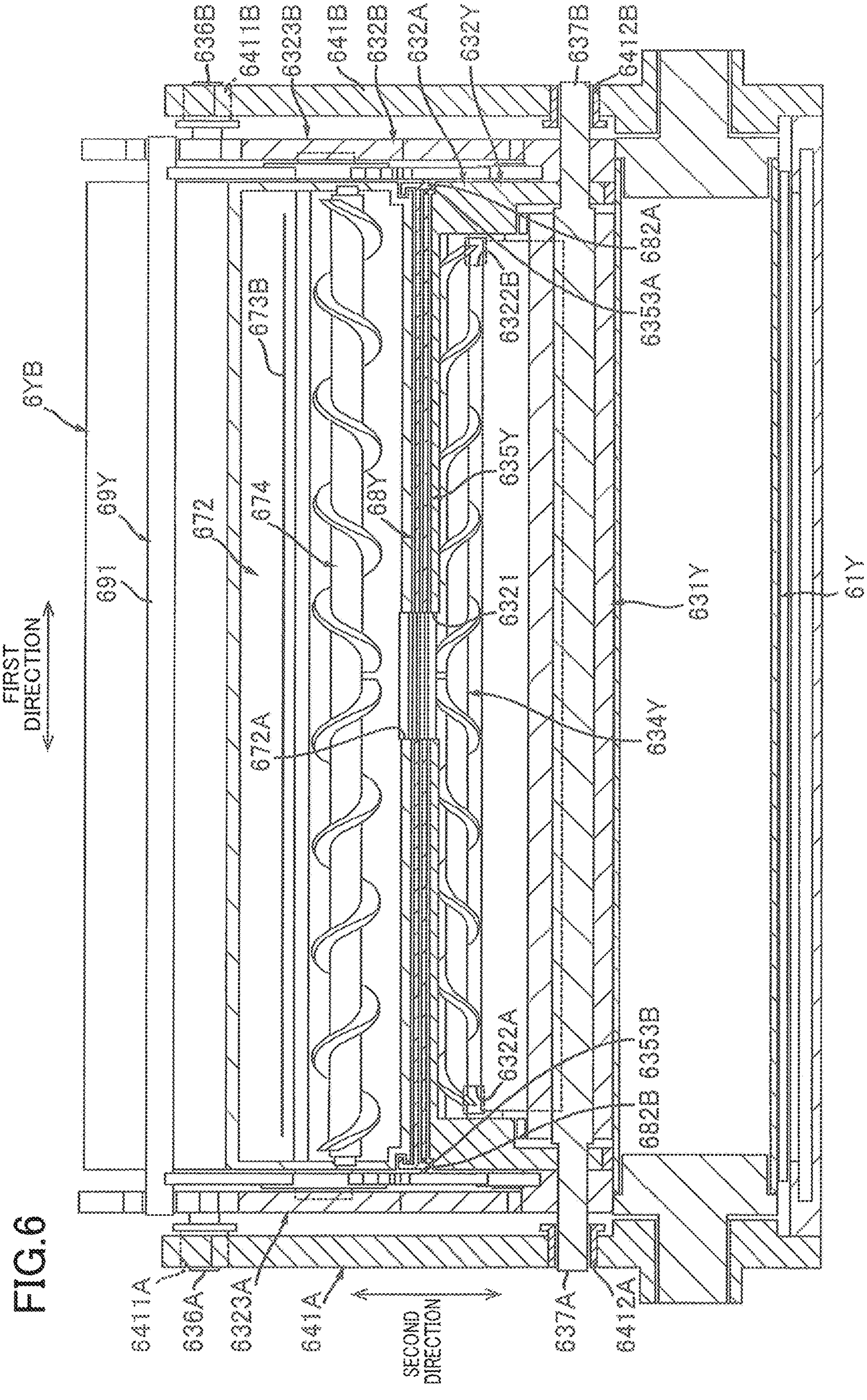
FIG. 6 is a cross sectional view of a toner storage unit taken along line VI-VI in FIG. 3.

As illustrated in FIG. 6, the developer inlet 6321 is located at a central part of the first frame 632A in the first direction. The developer inlet 6321 communicates with an inner space of the first frame 632A. In the state in which the toner storage unit 6YB is mounted on the drum cartridge 6YA, the developer inlet 6321 is capable of receiving toner from the toner storage unit 6YB. As illustrated in FIG. 3, the developer inlet 6321 and the developing roller 631Y are arranged in the second direction. In the state in which the process cartridge 6Y is mounted on the image forming apparatus 1, the developer inlet 6321 is located at a position upper than the supplying roller 633Y. In the state in which the process cartridge 6Y is mounted on the image forming apparatus 1, the developer inlet 6321 is located at a position upper than the toner conveying member 634Y.

As illustrated in FIG. 6, the developer discharge outlet 6322A is located at a first end of the first frame 632A in the first direction. The developer discharge outlet 6322A is capable of discharging the toner in the developer housing 632Y. More specifically, the developer discharge outlet 6322A is capable of discharging the toner in the first frame 632A. The developer discharge outlet 6322A communicates with the inner space of the first frame 632A. In the state in which the process cartridge 6Y is mounted on the image forming apparatus 1, the developer discharge outlet 6322A is located at a position lower than the supplying roller 633Y. In the state in which the process cartridge 6Y is mounted on the image forming apparatus 1, the developer discharge outlet 6322A is located at a position lower than the toner conveying member 634Y.

The developer discharge outlet 6322B is located at a second end of the first frame 632A in the first direction. The developer discharge outlet 6322B is capable of discharging the toner in the developer housing 632Y. More specifically, the developer discharge outlet 6322B is capable of discharging the toner in the first frame 632A. The developer discharge outlet 6322B communicates with the inner space of the first frame 632A. As illustrated in FIG. 3, in the state in which the process cartridge 6Y is mounted on the image forming apparatus 1, the developer discharge outlet 6322B is located at a position lower than the supplying roller 633Y. In the state in which the process cartridge 6Y is mounted on the image forming apparatus 1, the developer discharge outlet 6322B is located at a position lower than the toner conveying member 634Y.

Second Frame

Figure 7:
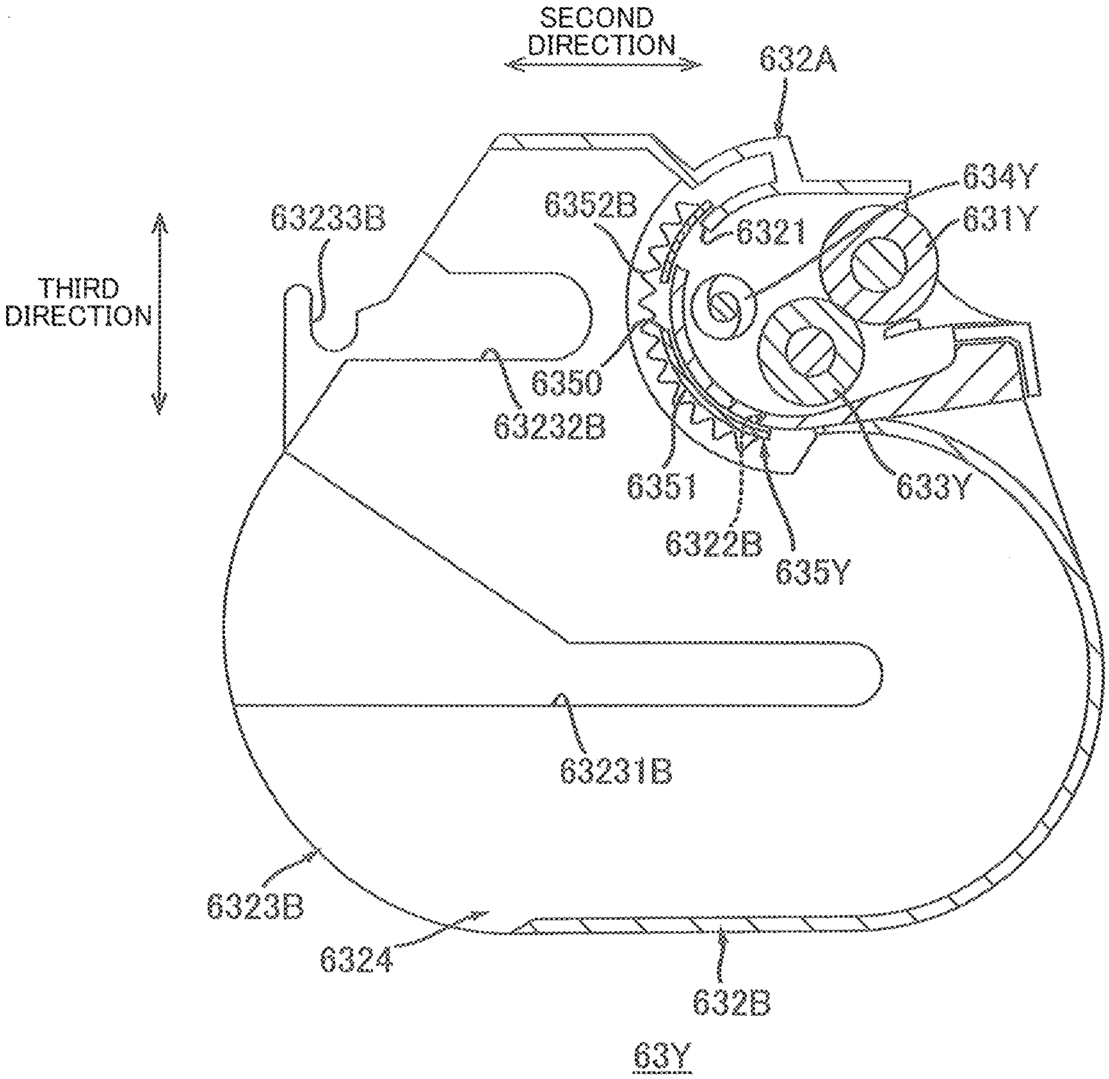
FIG. 7 is a view illustrating a state in which a developer shutter is positioned at a developer closed position illustrated in FIG. 5.

In the state in which the toner storage unit 6YB is mounted on the drum cartridge 6YA, the second frame 632B supports the toner storage unit 6YB. As illustrated in FIG. 5, the second frame 632B is connected to the first frame 632A. The second frame 632B extends in the first direction. The second frame 632B has a tubular shape. The second frame 632B includes two side plates 6323A, 6323B. The second frame 632B includes an opening 6324, as illustrated in FIG. 7.

As illustrated in FIG. 6, the side plate 6323A is located at a first end of the second frame 632B in the first direction. The side plate 6323A is located between the first end of the first frame 632A and the drum side plate 641A in the first direction. As illustrated in FIG. 5, the side plate 6323A extends in the second direction and the third direction. The side plate 6323A includes two guides 63231A, 63232A and a lock groove 63233A. It is noted that the guides 63231A, 63232A are not illustrated. The guide 63231A is the same configuration as a guide 63231B of the side plate 6323B, which will be described below, and the guide 63232A is the same configuration as a guide 63232B of the side plate 6323B, which will be described below. Accordingly, an explanation of the guide 63231A, 63232A is dispensed with.

The lock groove 63233A is located on an opposite side of the photoconductive drum 61Y with respect to the developing roller 631Y. The lock groove 63233A is recessed in the third direction. In the state in which the process cartridge 6Y is mounted on the image forming apparatus 1, the lock groove 63233A is recessed downward.

As illustrated in FIG. 6, the side plate 6323B is located at a second end of the second frame 632B in the first direction. The side plate 6323B is located between the second end of the first frame 632A and the drum side plate 641B in the first direction. As illustrated in FIG. 7, the side plate 6323B extends in the second direction and the third direction. The side plate 6323B includes the two guides 63231B, 63232B and a lock groove 63233B. The second frame 632B includes the guide 63231B.

The guide 63231B guides the toner storage unit 6YB when the toner storage unit 6YB is mounted on and removed from the second frame 632B. The guide 63231B extends in the second direction. In a state in which the toner storage unit 6YB is mounted on the drum cartridge 6YA, and the drum cartridge 6YA and the drum cartridge 6MA (see FIG. 1) are mounted on the drawer 5, the guide 63231B extends in a direction directed from the drum cartridge 6YA to the drum cartridge 6MA.

The guide 63232B is spaced apart from the guide 63231B in the third direction. In the state in which the process cartridge 6Y is mounted on the image forming apparatus 1, the guide 63232B is located above the guide 63231B. The guide 63232B guides the toner storage unit 6YB together with the guide 63231B when the toner storage unit 6YB is mounted on and removed from the second frame 632B. The guide 63232B extends in the second direction.

The lock groove 63233B is located on an opposite side of the photoconductive drum 61Y with respect to the developing roller 631Y. The lock groove 63233B is recessed in the third direction. In the state in which the process cartridge 6Y is mounted on the image forming apparatus 1, the lock groove 63233B is recessed downward.

Supplying Roller

The supplying roller 633Y supplies the toner in the first frame 632A to the developing roller 631Y. The supplying roller 633Y is in contact with the developing roller 631Y. The supplying roller 633Y extends in the first direction. The supplying roller 633Y has a column shape. The supplying roller 633Y is rotatable around a supply axis A3. The supply axis A3 extends in the first direction.

Toner Conveying Member

As illustrated in FIG. 6, the toner conveying member 634Y conveys the toner in the first frame 632A in the first direction. The toner conveying member 634Y conveys the toner in the first frame 632A from the developer inlet 6321 toward the developer discharge outlets 6322A, 6322B. In the present embodiment, the toner conveying member 634Y is an auger screw. The toner conveying member 634 is not limited to the auger screw as long as the toner conveying member 634 can convey the toner. For example, the toner conveying member 634Y may be a shaft-less screw.

Developer Shutter

Figure 8:
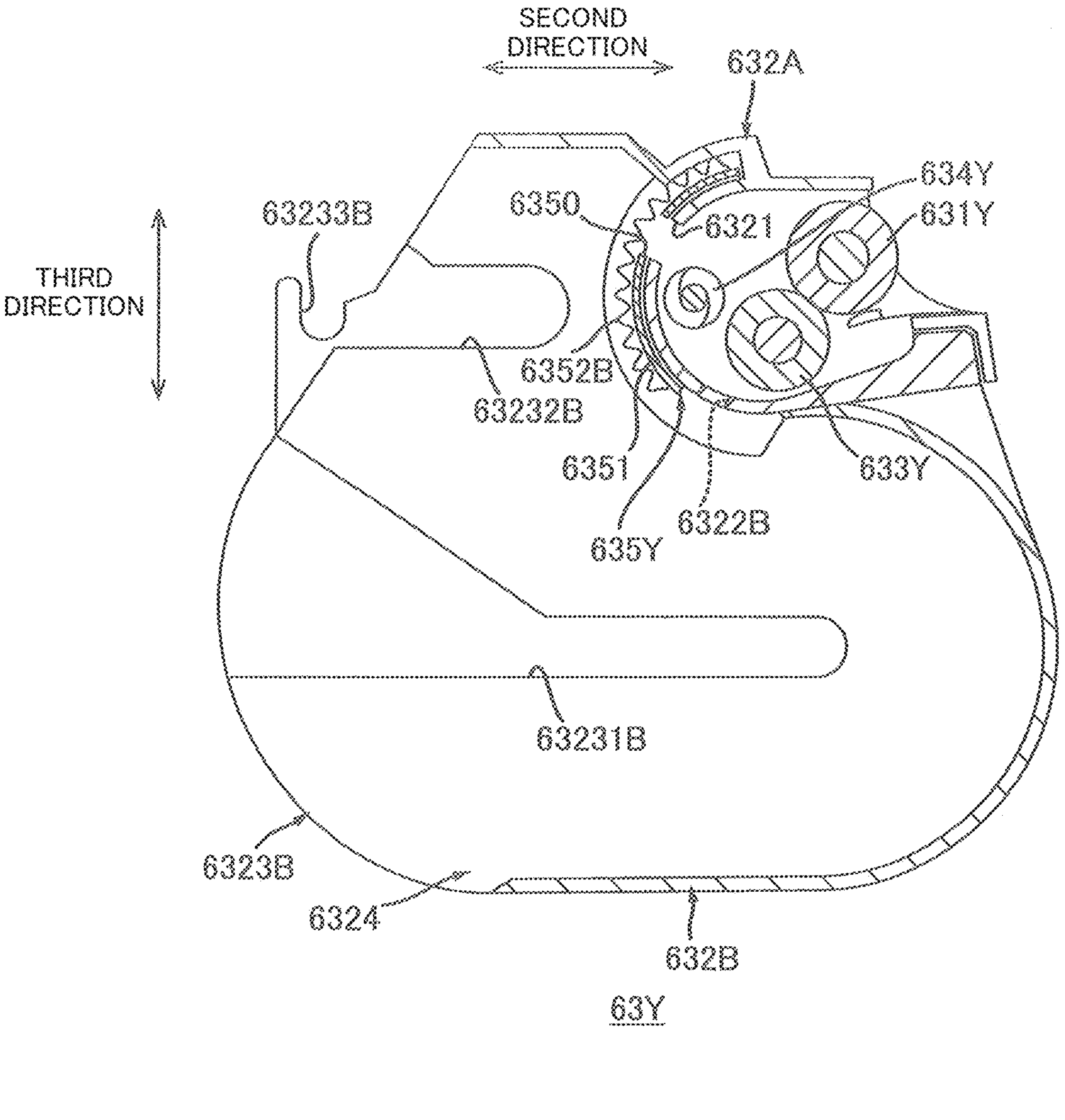
FIG. 8 is a view illustrating a state in which the developer shutter is positioned at a developer open position illustrated in FIG. 5.

As illustrated in FIG. 5, the developer shutter 635Y is attached to the first frame 632A. As illustrated in FIG. 7 and FIG. 8, the developer shutter 635Y is movable between a developer closed position (see FIG. 7) and a developer open position (see FIG. 8). As illustrated in FIG. 7, in a state in which the developer shutter 635Y is positioned at the developer closed position, the developer shutter 635Y closes the developer inlet 6321 and the developer discharge outlets 6322A, 6322B. On the other hand, as illustrated in FIG. 8, in a state in which the developer shutter 635Y is located at the developer open position, the developer inlet 6321 and the developer discharge outlets 6322A, 6322B are open. As illustrated in FIG. 5 and FIG. 7, the developer shutter 635Y includes a developer shutter body 6351 and two engaging portions 6352A (see FIG. 5), 6352B (see FIG. 7).

The developer shutter body 6351 extends in the first direction. The developer shutter body 6351 includes an opening 6350. As illustrated in FIG. 7, in a state in which the developer shutter 635Y is positioned at the developer closed position, the opening 6350 is spaced apart from the developer inlet 6321. As illustrated in FIG. 8, in a state in which the developer shutter 635Y is positioned at the developer open position, the opening 6350 communicates with the developer inlet 6321.

Figure 9:
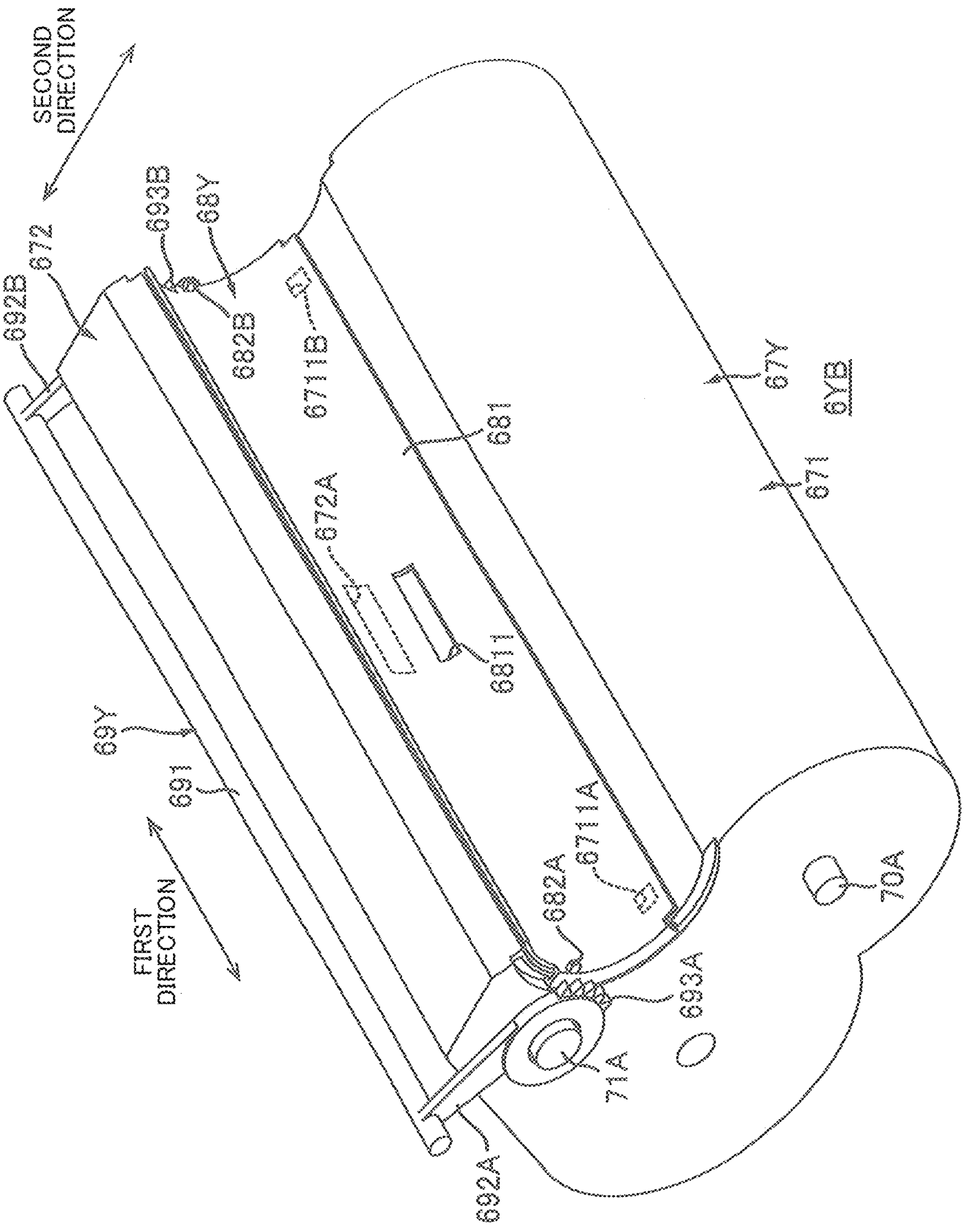
FIG. 9 is a perspective view of the toner storage unit illustrated in FIG. 3.

As illustrated in FIG. 5, the engaging portion 6352A is located at a first end of the developer shutter 635Y in the first direction. In the state in which the toner storage unit 6YB is mounted on the drum cartridge 6YA, the engaging portion 6352A engages with an engaging portion 693A of the toner storage unit 6YB, as illustrated in FIG. 9. In the present embodiment, the engaging portion 6352A is a gear. In the state in which the toner storage unit 6YB is mounted on the drum cartridge 6YA, the engaging portion 6352A engages with the engaging portion 693A of the toner storage unit 6YB. It is noted that the engaging portion 6352A is not limited to a gear as long as a lock member 69Y of the toner storage unit 6YB (see FIG. 9) and the developer shutter 635Y can be geared to each other.

As illustrated in FIG. 7, the engaging portion 6352B is located at a second end of the developer shutter 635Y in the first direction. In the state in which the toner storage unit 6YB is mounted on the drum cartridge 6YA, the engaging portion 6352B engages with an engaging portion 693B of the toner storage unit 6YB (see FIG. 9). The engaging portion 6352B is the same configuration as the engaging portion 6352A. Accordingly, an explanation of the engaging portion 6352B is dispensed with.

Protrusion

As illustrated in FIG. 5, a protrusion 636A is located at a first end of the developing unit 63Y in the first direction. The protrusion 636A extends in the first direction. In the present embodiment, the protrusion 636A extends from a first side outer surface of the developer housing 632Y in the first direction. The protrusion 636A may be attached to the first outer surface of the developer housing 632Y in the first direction. The protrusion 636A has a column shape. The protrusion 636A is fitted into the hole 6411A of the drum side plate 641A (see FIG. 4).

A protrusion 637A is spaced apart from the protrusion 636A in the fourth direction. The protrusion 637A is located between the photoconductive drum 61Y (see FIG. 3) and the protrusion 636A in the fourth direction. The protrusion 637A is located at a first end of the developer housing 632Y in the first direction. The protrusion 637A extends in the first direction. In the present embodiment, the protrusion 637A extends from the first side outer surface of the developer housing 632Y in the first direction. The protrusion 637A may be attached to the first side outer surface of the developer housing 632Y in the first direction. The protrusion 637A has a column shape. The protrusion 637A may be a first end of a shaft of the developing roller 631Y. The protrusion 637A is fitted into the hole 6412A of the drum side plate 641A (see FIG. 4).

Protrusion

As illustrated in FIG. 3, a protrusion 636B is located at a second end of the developing unit 63Y in the first direction. The protrusion 636B extends in the first direction. In the present embodiment, the protrusion 636B extends from a second side outer surface of the developer housing 632Y in the first direction. The protrusion 636B may be attached to the second side outer surface of the developer housing 632Y in the first direction. The protrusion 636B has a column shape. The protrusion 636B is fitted into the hole 6411B of the drum side plate 641B (see FIG. 4).

As illustrated in FIG. 5, the protrusion 637B is spaced apart from the protrusion 636B in the fourth direction. The protrusion 637B is located between the photoconductive drum 61Y and the protrusion 636B in the fourth direction. The protrusion 637B is located at the second end of the developing unit 63Y in the first direction. The protrusion 637B extends in the first direction. In the present embodiment, the protrusion 637B extends from the second side outer surface of the developer housing 632Y in the first direction. The protrusion 637B may be attached to the second side outer surface of the developer housing 632Y in the first direction. The protrusion 637B has a column shape. The protrusion 637B may be a second end of the shaft of the developing roller 631. The protrusion 637B is fitted into the hole 6412B of the drum side plate 641B (see FIG. 6).

When the protrusion 636A is fitted into the hole 6411A of the drum side plate 641A, the protrusion 637A is fitted into the hole 6412A of the drum side plate 641A, the protrusion 636B is fitted to the hole 6411B of the drum side plate 641B, and the protrusion 637B is fitted into the hole 6412B of the drum side plate 641B, the developing unit 63Y is movable in the fourth direction with respect to the photoconductive drum 61Y.

Drum Cleaner

As illustrated in FIG. 3, the drum cleaner 65Y is provided for the drum frame 64Y. The drum cleaner 65Y is located on an opposite side of the developing roller 631Y in the second direction with respect to the photoconductive drum 61Y. The drum cleaner 65Y is capable of cleaning the circumferential surface of the photoconductive drum 61Y. The drum cleaner 65Y is located between the drum side plate 641A and the drum side plate 641B in the first direction. The drum cleaner 65Y includes a cleaner housing 651 and a cleaning member 652.

As illustrated in FIG. 4, the cleaner housing 651 extends in the first direction. A first end of the cleaner housing 651 in the first direction is connected to the drum side plate 641A. A second end of the cleaner housing 651 in the first direction is connected to the drum side plate 641B. The cleaner housing 651 includes an opening 6511.

The cleaning member 652 cleans the circumferential surface of the photoconductive drum 61Y. The cleaning member 652 extends in the first direction. The cleaning member 652 has a plate shape. An edge of the cleaning member 652 is in contact with the circumferential surface of the photoconductive drum 61Y. When the photoconductive drum 61Y rotates, the remaining toner which is toner not transferred to the sheet S and remaining on the circumferential surface of the photoconductive drum 61Y is removed from the circumferential surface of the photoconductive drum 61Y by the edge of the cleaning member 652. The removed toner enters into the cleaner housing 651 through the opening 6511.

Handle

As illustrated in FIG. 3, in the state in which the process cartridge 6Y is mounted on the image forming apparatus 1, the handle 66Y is located at an upper end of the drum frame 64Y. The handle 66Y is gripped by a user when the user removes the drum cartridge 6YA from the drawer 5. As illustrated in FIG. 4, the handle 66Y includes a handle grip 661 and two arms 662A, 662B.

The handle grip 661 is a portion gripped by the user. The handle grip 661 extends in the first direction. The handle grip 661 includes a column shape.

The arm 662A connects a first end of the handle grip 661 in the first direction with the drum side plate 641A. A first end of the arm 662A in the first direction is connected to the first end of the handle grip 661 in the first direction. A second end of the arm 662A in the first direction is connected to the drum side plate 641A.

The arm 662B connects a second end of the handle grip 661 in the first direction with the drum side plate 641B. A first end of the arm 662B in the first direction is connected to the second end of the handle grip 661 in the first direction. A second end of the arm 662B in the first direction is connected to the drum side plate 641B.

Toner Storage Unit

Figure 10:
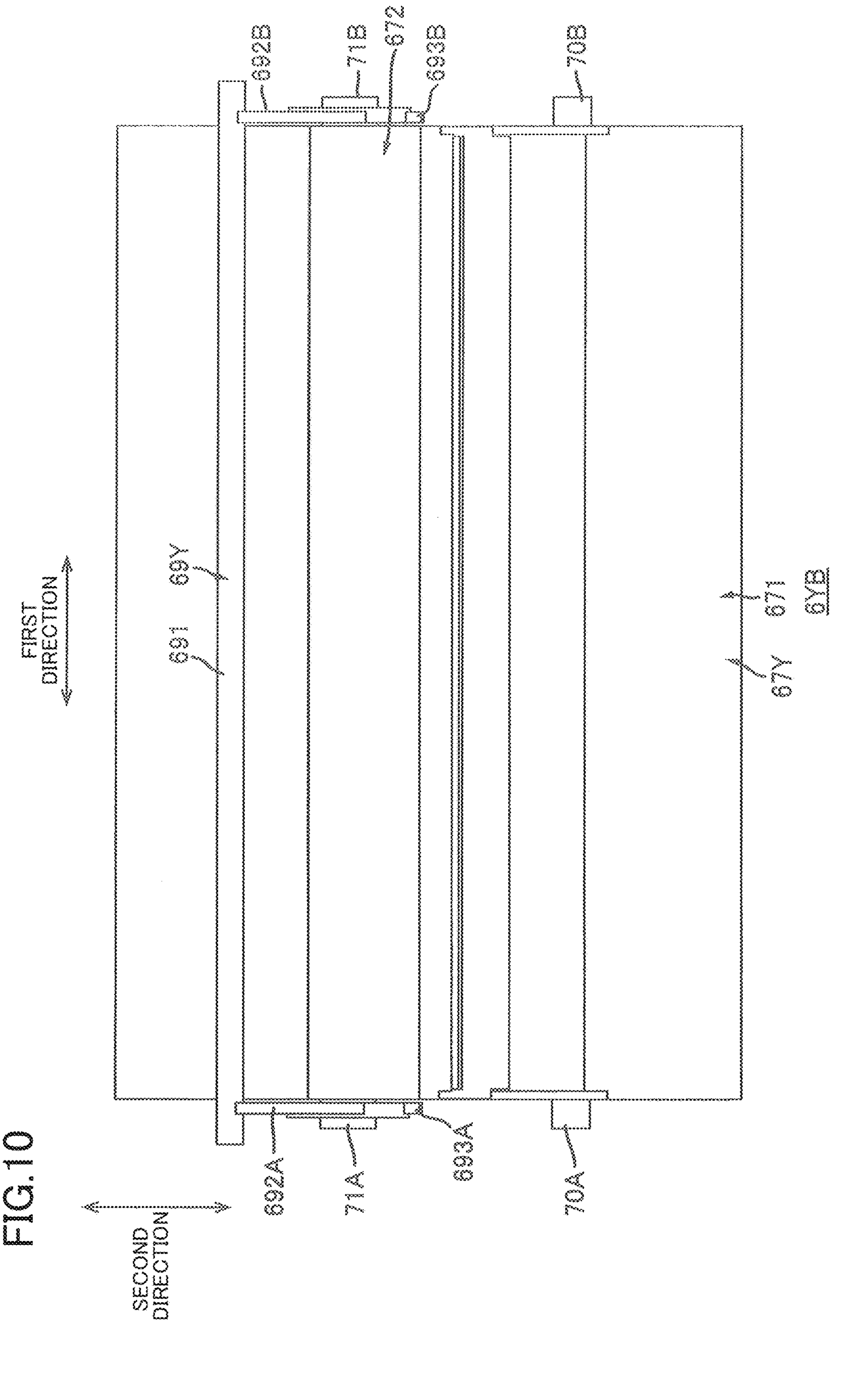
FIG. 10 is a plan view of the toner storage unit illustrated in FIG. 9.

As illustrated in FIG. 9 and FIG. 10, the toner storage unit 6YB includes a storage unit body 67Y, a toner shutter 68Y, the lock member 69Y, two protrusions 70A, 71A and two protrusions 70B, 71B. That is, the process cartridge 6Y includes the lock member 69Y.

Storage Unit Body

Figure 11:
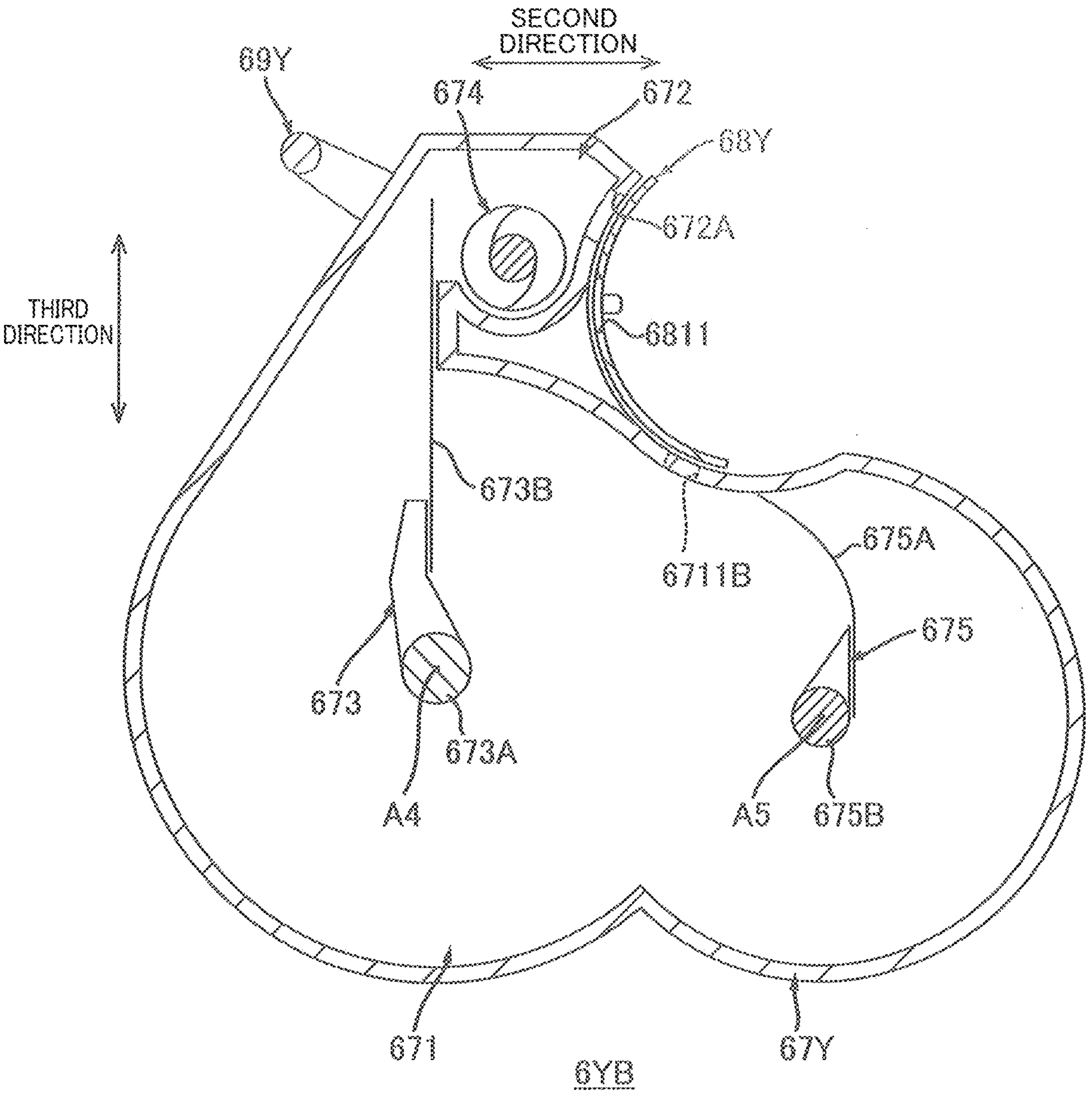
FIG. 11 is a cross sectional view of the toner storage unit illustrated in FIG. 10 in which a toner shutter is positioned at a toner closed position.

The storage unit body 67Y extends in the first direction. The storage unit body 67Y has a tubular shape. As illustrated in FIG. 11, the storage unit body 67Y includes a first toner storage chamber 671, a second toner storage chamber 672, a first toner conveying member 673, a second toner conveying member 674 and a third toner conveying member 675. In other words, the toner storage unit 6YB includes the first toner storage chamber 671, the second toner storage chamber 672, the first toner conveying member 673, the second toner conveying member 674 and the third toner conveying member 675. That is, the process cartridge 6Y includes the third toner conveying member 675.

First Toner Storage Chamber

The first toner storage chamber 671 is capable of storing toner. In the state in which the process cartridge 6Y is mounted on the image forming apparatus 1, the first toner storage chamber 671 is located below the second toner storage chamber 672. In the state in which the process cartridge 6Y is mounted on the image forming apparatus 1, at least a part of the first toner storage chamber 671 is located below the developing unit 63Y, as illustrated in FIG. 3. The at least the part of the first toner storage chamber 671 is located below the developing roller 631Y of the developing unit 63Y, as illustrated in FIG. 3. A volume of the first toner storage chamber 671 is greater than a volume of the second toner storage chamber 672. As illustrated in FIG. 9, the first toner storage chamber 671 includes two toner inlets 6711A, 6711B. In other words, the toner storage unit 6YB includes the two toner inlets 6711A, 6711B.

The toner inlet 6711A is located at a first end of the first toner storage chamber 671 in the first direction. The toner inlet 6711A communicates with an inner space of the first toner storage chamber 671. In the state in which the toner storage unit 6YB is mounted on the drum cartridge 6YA, the toner inlet 6711A communicates with the developer discharge outlet 6322A, as illustrated in FIG. 6. In the state in which the toner storage unit 6YB is mounted on the drum cartridge 6YA, the toner inlet 6711A is capable of receiving the toner discharged from the developer discharge outlet 6322A.

The toner inlet 6711B is located at a second end of the first toner storage chamber 671 in the first direction. The toner inlet 6711B communicates with the inner space of the first toner storage chamber 671. In the state in which the toner storage unit 6YB is mounted on the drum cartridge 6YA, the toner inlet 6711B communicates with the developer discharge outlet 6322B, as illustrated in FIG. 6. In the state in which the toner storage unit 6YB is mounted on the drum cartridge 6YA, the toner inlet 6711B is capable of receiving the toner discharged from the developer discharge outlet 6322B.

Second Toner Storage Chamber

As illustrated in FIG. 11, the second toner storage chamber 672 is capable of storing the toner conveyed from the first toner storage chamber 671. In the state in which the process cartridge 6Y is mounted on the image forming apparatus 1, the second toner storage chamber 672 is located above the first toner storage chamber 671. In the state in which the process cartridge 6Y is mounted on the image forming apparatus 1, the second toner storage chamber 672 and the developing unit 63Y are arranged in the second direction, as illustrated in FIG. 3. The second toner storage chamber 672 has a toner discharge outlet 672A.

The toner discharge outlet 672A communicates with the inner space of the second toner storage chamber 672. As illustrated in FIG. 9, the toner discharge outlet 672A is located at a central part of the second toner storage chamber 672 in the first direction. In the state in which the toner storage unit 6YB is mounted on the drum cartridge 6YA, the toner discharge outlet 672A communicates with the developer inlet 6321, as illustrated in FIG. 6. In the state in which the toner storage unit 6YB is mounted on the drum cartridge 6YA, the toner discharge outlet 672A is capable of discharging the toner toward the developer inlet 6321.

First Toner Conveying Member

The first toner conveying member 673 is located in the first toner storage chamber 671. The first toner conveying member 673 is capable of conveying the toner in the first toner storage chamber 671 toward the second toner storage chamber 672. More specifically, the first toner conveying member 673 includes a shaft 673A and a blade 673B.

The shaft 673A extends in the first direction. The shaft 673A is rotatable around an axis A4. The axis A4 extends in the first direction.

The blade 673B is attached to the shaft 673A. The blade 673B is rotatable together with the shaft 673A. When the shaft 673A rotates, the blade 673B rotates together with the shaft 673A so as to convey the toner upward toward the second toner storage chamber 672. As illustrated in FIG. 6, a length of the blade 673B is longer than a length of the toner discharge outlet 672A in the first direction. The length of the blade 673B in the first direction is substantially the same length as the inner space of the first toner storage chamber 671 in the first direction. The blade 673B extends over a whole width of the inner space of the first toner storage chamber 671 in the first direction. As a result of this, the first toner conveying member 673 is capable of conveying the toner in the first toner storage chamber 671 upward toward the second toner storage chamber 672 in an area wider than a width of the toner discharge outlet 672A in the first direction.

Second Toner Conveying Member

As illustrated in FIG. 6 and FIG. 11, the second toner conveying member 674 is located in the second toner storage chamber 672. The second toner conveying member 674 is capable of conveying the toner in the second toner storage chamber 672 in the first direction toward the toner discharge outlet 672A. More specifically, the second toner conveying member 674 conveys the toner from ends of the second storage chamber 672 in the first direction toward a central part of the second toner storage chamber 672 in the first direction such that the toner is conveyed toward the toner discharge outlet 672A. The second toner conveying member 674 extends in the first direction. In the present embodiment, the second toner conveying member 674 is an auger screw. The second toner conveying member 674 is not limited to the auger screw. For example, the second toner conveying member 674 may be a shaft-less screw.

Third Toner Conveying Member

As illustrated in FIG. 11, the third toner conveying member 675 is located in the first toner storage chamber 671. The third toner conveying member 675 is spaced apart from the first toner conveying member 673 in the second direction. In the state in which the process cartridge 6Y is mounted on the image forming apparatus 1, the third toner conveying member 675 is located below the developer housing 632Y, as illustrated in FIG. 3. The third toner conveying member 675 is capable of conveying the toner in the first toner storage chamber 671 toward the first toner conveying member 673. The third toner conveying member 675 includes a shaft 675A and a blade 675B.

The shaft 675A extends in the first direction. The shaft 675A is rotatable around an axis A5. The axis A5 extends in the first direction.

The blade 675B is attached to the shaft 675A. The blade 675B is rotatable together with the shaft 675A. When the shaft 675A rotates, the blade 675B rotates together with the shaft 675A so as to convey the toner toward the first toner conveying member 673.

Toner Shutter

Figure 12:
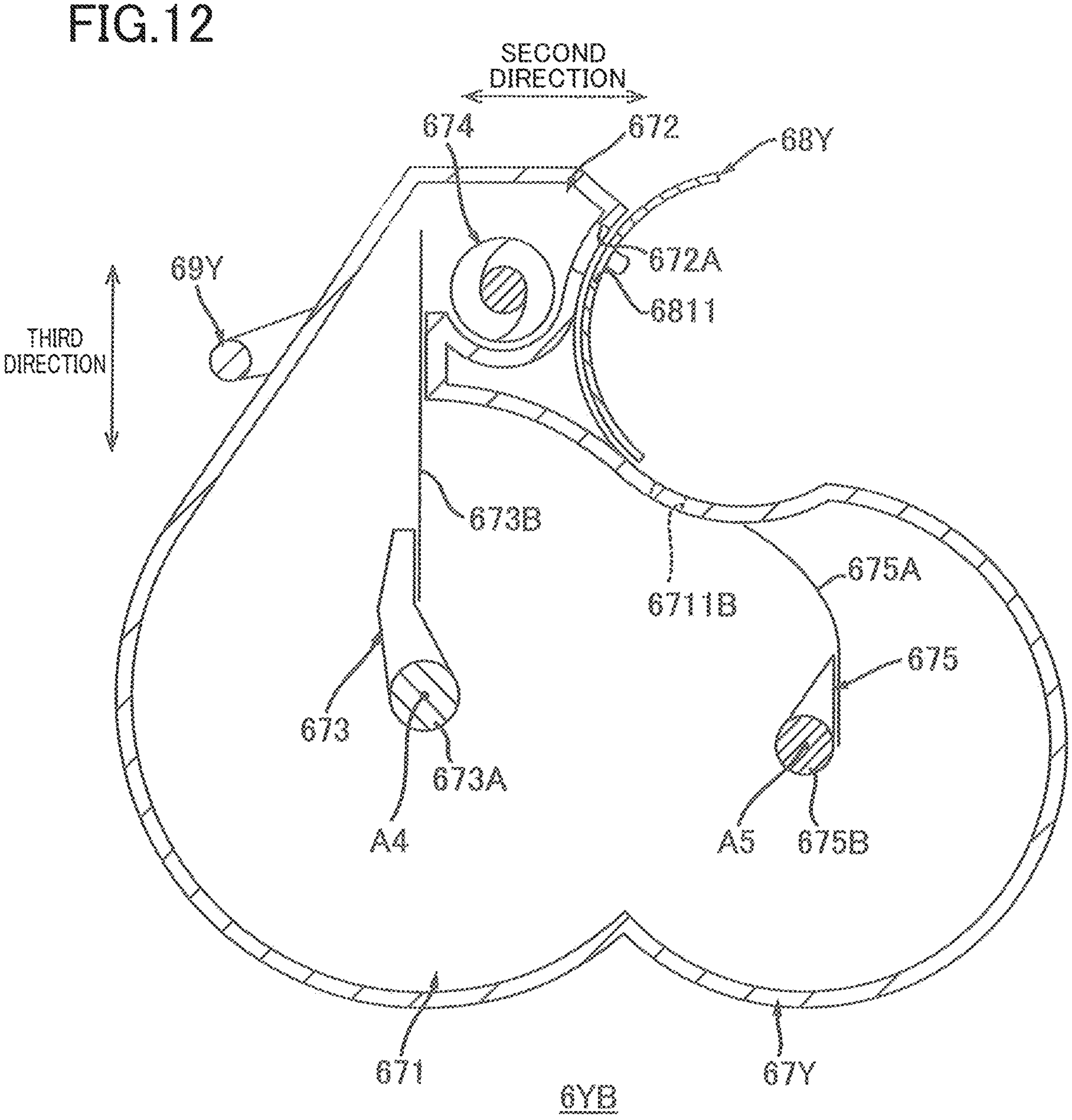
FIG. 12 is a cross sectional view of the toner storage unit illustrated in FIG. 10 in which the toner shutter is positioned at a toner open position.

As illustrated in FIG. 9, the toner shutter 68Y is attached to the storage unit body 67Y. As illustrated in FIG. 11 and FIG. 12, the toner shutter 68Y is movable between a toner closed position (see FIG. 11) and a toner open position (see FIG. 12). As illustrated in FIG. 11, in a state in which the toner shutter 68Y is positioned at the toner closed position, the toner shutter 68Y closes the toner discharge outlet 672A and the toner inlets 6711A, 6711B. As illustrated in FIG. 12, in a state in which the toner shutter 68Y is positioned at the toner open position, the toner discharge outlet 672A and the toner inlets 6711A, 6711B are open. As illustrated in FIG. 9, the toner shutter 68Y includes a toner shutter body 681 and two protrusions 682A, 682B.

The toner shutter body 681 extends in the first direction. The toner shutter body 681 has an opening 6811. As illustrated in FIG. 11, in the state in which the toner shutter 68Y is positioned at the toner closed position, the opening 6811 is spaced apart from the toner discharge outlet 672A. As illustrated in FIG. 12, in the state in which the toner shutter 68Y is positioned at the toner open position, the opening 6811 communicates with the toner discharge outlet 672A.

As illustrated in FIG. 9, the protrusion 682A is located at a first end of the toner shutter 68Y in the first direction. The protrusion 682A extends from the toner shutter body 681. The protrusion 682A may be attached to the toner shutter body 681. In the state in which the toner storage unit 6YB is mounted on the drum cartridge 6YA, the protrusion 682A engages with a first end of the developer shutter 635Y in the first direction. More specifically, the protrusion 682A is fitted into a hole 6353A formed at the first end of the developer shutter 635Y in the first direction.

The protrusion 682B is located at a second end of the toner shutter 68Y in the first direction. The protrusion 682B extends from the toner shutter body 681. The protrusion 682B may be attached to the toner shutter body 681. In the state in which the toner storage unit 6YB is mounted on the drum cartridge 6YA, the protrusion 682B engages with a second end of the developer shutter 635Y in the first direction. More specifically, the protrusion 682B is fitted into a hole 6353B formed at the second end of the developer shutter 635Y in the first direction.

When the protrusion 682A engages with the first end of the developer shutter 635Y in the first direction and the protrusion 682B engages with the second end of the developer shutter 635Y in the first direction, the toner shutter 68Y is movable together with the developer shutter 635Y. As a result of this, in the state in which the toner storage unit 6YB is mounted on the developing unit 63Y, the toner shutter 68Y moves from the toner open position to the toner closed position along with a movement of the developer shutter 635Y from the developer open position to the developer closed position. Moreover, in the state in which the toner storage unit 6YB is mounted on the developing unit 63Y, the toner shutter 68Y moves from the toner closed position to the toner open position along with a movement of the developer shutter 635Y from the developer closed position to the developer open position.

Lock Member

As illustrated in FIG. 9, the lock member 69Y is attached to the storage unit body 67Y. As illustrated in FIG. 3 and FIG. 11, in the state in which the toner storage unit 6YB is mounted on the developing unit 63Y of the drum cartridge 6YA, the lock member 69Y is movable between a lock position (see FIG. 3) and a lock release position (see FIG. 11). As illustrated in FIG. 3, in a state in which the lock member 69Y is positioned at the lock position, the lock member 69Y is fitted into the lock groove 63233A and the lock groove 63233B (see FIG. 5). As a result of this, in the state in which the lock member 69Y is positioned at the lock position, the lock member 69Y locks the toner storage unit 6YB to the developing unit 63Y of the drum cartridge 6YA. On the other hand, in a state in which the toner storage unit 6YB is mounted on the developing unit 63Y and the lock member 69Y is positioned at the lock release position illustrated in FIG. 11, the lock member 69Y is released from the lock groove 63233A and the lock groove 63233B (see FIG. 5). As a result of this, in the state in which the lock member 69Y is positioned at the lock release position, a lock between the toner storage unit 6YB and the developing unit 63Y of the drum cartridge 6YA is released.

As illustrated in FIG. 9, the lock member 69Y includes a lock grip 691, two arms 692A, 692B and the two engaging portions 693A, 693B.

Lock Grip

The lock grip 691 is gripped by the user. The lock grip 691 extends in the first direction. The lock grip 691 has a column shape.

As illustrated in FIG. 1, in a state in which the toner storage unit 6YB is mounted on the drum cartridge 6YA, the lock member 69Y is positioned at the lock position and the drum cartridge 6YA is mounted on the drawer 5, the handle grip 661 is located at a position upper than the lock grip 691.

In a state in which the toner storage unit 6YB is mounted on the drum cartridge 6YA, the lock member 69Y is positioned at the lock position, the drum cartridge 6YA is mounted on the drawer 5 and the drawer 5 is positioned at the accommodated position, the lock grip 691 is located at a position lower than an upper end of the toner storage unit 6YB.

Moreover, in a state in which the toner storage unit 6YB is mounted on the drum cartridge 6YA, the lock member 69Y is positioned at the lock position and the drum cartridge 6YA and the drum cartridge 6MA are mounted on the drawer 5, the lock grip 691 of the lock member 69Y is located between the toner storage unit 6YB and the drum cartridge 6MA. In a state in which the toner storage unit 6YB is mounted on the drum cartridge 6YA, the lock member 69Y is positioned at the lock position and the drum cartridge 6YA and the drum cartridge 6MA are mounted on the drawer 5, the lock grip 691 of the lock member 69Y is located between the toner storage unit 6YB and the photoconductive drum 61M.

Arm

The arm 692A connects a first end of the lock grip 691 in the first direction with a protrusion 71A. A first end of the arm 692A in the first direction is connected to the first end of the lock grip 691. A second end of the arm 692A in the first direction is connected to the protrusion 71A. The arm 692A is rotatable around the protrusion 71A.

The arm 692B connects a second end of the lock grip 691 in the first direction with a protrusion 71B, as illustrated in FIG. 10. A first end of the arm 692B in the first direction is connected to the second end of the lock grip 691. A second end of the arm 692B in the first direction is connected to the protrusion 71B. The arm 692B is rotatable around the protrusion 71B.

Engaging Portion

The engaging portion 693A is provided for the second end of the arm 692A. In the state in which the toner storage unit 6YB is mounted on the drum cartridge 6YA, the engaging portion 693A engages with the engaging portion 6352A of the developer shutter 635Y (see FIG. 5). In the present embodiment, the engaging portion 693A is a gear. In the state in which the toner storage unit 6YB is mounted on the drum cartridge 6YA, the engaging portion 693A engages with the engaging portion 6352A of the developer shutter 635Y. It is noted that the engaging portion 693A is not limited to the gear as long as the lock member 69Y and the developer shutter 635Y can be geared to each other.

The engaging portion 693B is provided for the second end of the arm 692B. In the state in which the toner storage unit 6YB is mounted on the drum cartridge 6YA, the engaging portion 693B engages with the engaging portion 6352B of the developer shutter 635Y (see FIG. 7). In the present embodiment, the engaging portion 693B is a gear. In the state in which the toner storage unit 6YB is mounted on the drum cartridge 6YA, the engaging portion 693B engages with the engaging portion 6352B of the developer shutter 635Y. It is noted that the engaging portion 693B is not limited to the gear as long as the lock member 69Y and the developer shutter 635Y can be geared to each other.

In the state in which the toner storage unit 6YB is mounted on the drum cartridge 6YA, when the engaging portion 693A engages with the engaging portion 6352A of the developer shutter 635Y and the engaging portion 693B engages with the engaging portion 6352B of the developer shutter 635Y, the developer shutter 635Y is capable of being geared to the lock member 69Y.

In the state in which the toner storage unit 6YB is mounted on the developing unit 63Y, the developer shutter 635Y moves from the developer open position (see FIG. 8) to the developer closed position (see FIG. 7) along with the movement of the lock member 69Y from the lock position (see FIG. 12) to the lock release position (see FIG. 11). At this time, the toner shutter 68Y moves from the toner open position (see FIG. 12) to the toner closed position (see FIG. 11) along with the movement of the developer shutter 635Y from the developer open position to the developer closed position.

Moreover, in the state in which the toner storage unit 6YB is mounted on the developing unit 63Y, the developer shutter 635Y moves from the developer closed position (see FIG. 7) to the developer open position (see FIG. 8) along with the movement of the lock member 69Y from the lock release position (see FIG. 11) to the lock position (see FIG. 12). At this time, the toner shutter 68Y moves from the toner closed position (see FIG. 11) to the toner open position (see FIG. 12) along with the movement of the developer shutter 635Y from the developer closed position to the developer open position.

Protrusion

As illustrated in FIG. 9, a protrusion 70A is located at the first end of the first toner storage chamber 671 in the first direction. The protrusion 70A extends from a first side outer surface of the first toner storage chamber 671 in the first direction. The protrusion 70A may be attached to the first side outer surface of the first toner storage chamber 671 in the first direction. When the toner storage unit 6YB is mounted on the drum cartridge 6YA, the protrusion 70A is guided by the guide 63231A of the developing unit 63Y.

The protrusion 71A is spaced apart from the protrusion 70A. The protrusion 71A is located at a first end of the second toner storage chamber 672 in the first direction. The protrusion 71A extends from a first side outer surface of the second toner storage chamber 672 in the first direction. The protrusion 71A may be attached to the first side outer surface of the second toner storage chamber 672 in the first direction. When the toner storage unit 6YB is mounted on the drum cartridge 6YA, the protrusion 71A is guided by the guide 63232A of the developing unit 63Y.

Protrusion

As illustrated in FIG. 10, a protrusion 70B is located at the second end of the first toner storage chamber 671 in the first direction. The protrusion 70B extends from a second side outer surface of the first toner storage chamber 671 in the first direction. The protrusion 70B may be attached to the second side outer surface of the first toner storage chamber 671 in the first direction. When the toner storage unit 6YB is mounted on the drum cartridge 6YA, the protrusion 70B is guided by the guide 63231B of the developing unit 63Y (see FIG. 7).

The protrusion 71B is spaced apart from the protrusion 70B. The protrusion 71B is located at a second end of the second toner storage chamber 672 in the first direction. The protrusion 71B extends from a second side outer surface of the second toner storage chamber 672 in the first direction. The protrusion 71B may be attached to the second side outer surface of the second toner storage chamber 672 in the first direction. When the toner storage unit 6YB is mounted on the drum cartridge 6YA, the protrusion 71B is guided by the guide 63232B of the developing unit 63Y (see FIG. 7).

Effects

According to the process cartridge 6Y, as illustrated in FIG. 3, it is possible to convey the toner by the first toner conveying member 673 from the first toner storage chamber 671 to the second toner storage chamber 672 in the area wider than the width of the toner discharge outlet 672A in the first direction.

As a result, it is possible to convey a large amount of toner, which is larger than an amount of toner supplied from the toner discharge outlet 672A to the developing unit 63Y, from the first toner storage chamber 671 to the second toner storage chamber 672.

As a result of this, it is possible to convey a sufficient amount of toner from the second toner storage chamber 672 of the toner storage unit 6YB to the developing unit 63Y.

According to the process cartridge 6Y, as illustrated in FIG. 3, in the state in which the toner storage unit 6YB is mounted on the developing unit 63Y, the developer shutter 635Y moves from the developer open position (see FIG. 8) to the developer closed position (see FIG. 7) along with the movement of the lock member 69Y from the lock position (see FIG. 3) to the lock release position (see FIG. 11). In the state in which the toner storage unit 6YB is mounted on the developing unit 63Y, the developer shutter 635Y moves from the developer closed position (see FIG. 7) to the developer open position (see FIG. 8) along with the movement of the lock member 69Y from the lock release position (see FIG. 11) to the lock position (see FIG. 3).

As a result of this, the user can open the developer shutter 635Y by an operation locking the toner storage unit 6YB to the developing unit 63Y, and the user can close the developer shutter 635Y by an operation releasing the lock between the toner storage unit 6YB and the developing unit 63Y.

As a result, the user does not need to separately do a locking-unlocking operation of the toner storage unit 6YB to the developing unit 63Y and an open-close operation of the developer shutter 635Y. Accordingly, it is possible to improve usability.

Moreover, it is possible to prevent a case in which the developer shutter 635Y is forgotten to be closed when the toner storage unit 6YB is removed from the developing unit 63Y.

According to the process cartridge 6Y, as illustrated in FIG. 3, in the state in which the toner storage unit 6YB is mounted on the developing unit 63Y, the toner shutter 68Y moves from the toner open position (see FIG. 12) to the toner closed position (see FIG. 11) along with the movement of the developer shutter 635Y from the developer open position (see FIG. 8) to the developer closed position (see FIG. 7). In the state in which the toner storage unit 6YB is mounted on the developing unit 63Y, the toner shutter 68Y moves from the toner closed position (see FIG. 11) to the toner open position (see FIG. 12) along with the movement of the developer shutter 635Y from the developer closed position (see FIG. 7) to the developer open position (see FIG. 8).

As a result of this, the user can open not only the developer shutter 635Y but also the toner shutter 68Y by the operation of locking the toner storage unit 6YB to the developing unit 63Y. Moreover, the user can close not only the developer shutter 635Y but also the toner shutter 68Y by the operation of the release of the lock between the toner storage unit 6YB and the developing unit 63Y.

As a result, the user does not need to separately do the locking-unlocking operation of the toner storage unit 6YB to the developing unit 63Y and an open-close operation of the toner shutter 68Y. Accordingly, it is possible to improve usability.

Moreover, it is possible to prevent a case in which the toner shutter 68Y is forgotten to be closed when the toner storage unit 6YB is removed from the developing unit 63Y.

According to the process cartridge 6Y, as illustrated in FIG. 3, the toner inlet 6711A, 6711B are capable of receiving the toner discharged from the developer discharge outlets 6322A, 6322B of the toner storage unit 6YB.

As a result, it is possible to return the toner in the developer housing 632Y to the toner storage unit 6YB through the toner inlet 6711A, 6711B.

Accordingly, it is possible to prevent a case where the toner having deteriorated in the developer housing 632Y accumulates in the developer housing 632Y.

According to the process cartridge 6Y, as illustrated in FIG. 3, the first toner storage chamber 671 includes the toner inlet 6711A, 6711B.

As a result, it is possible to return the toner in the developer housing 632Y to the first toner storage chamber 671.

Accordingly, it is possible to circulate the toner among the developer housing 632Y, the first toner storage chamber 671 and the second toner storage chamber 672. Therefore, it is possible to prevent acceleration of deterioration of the toner.

According to the process cartridge 6Y, as illustrated in FIG. 3, in the state in which the process cartridge 6Y is mounted on the image forming apparatus 1, the first toner storage chamber 671 is located at the below the developing unit 63Y.

Accordingly, it is possible to smoothly return the toner in the developer housing 632Y to the first toner storage chamber 671 by using gravity.

According to the process cartridge 6Y, as illustrated in FIG. 6, the length of the blade 673B of the first toner conveying member 673 is longer than the length of the toner discharge outlet 672A in the first direction.

Accordingly, it is possible to convey the toner by the first toner conveying member 673 from the first toner storage chamber 671 to the second toner storage chamber 672 in the area wider than the width of the toner discharge outlet 672A in the first direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modifications

There will be described modifications with reference to FIG. 13 and FIG. 14. In the modifications, the same reference numerals as used in the embodiment are used to designate the corresponding elements of the modifications, and an explanation of which is dispensed with.

Figure 13:
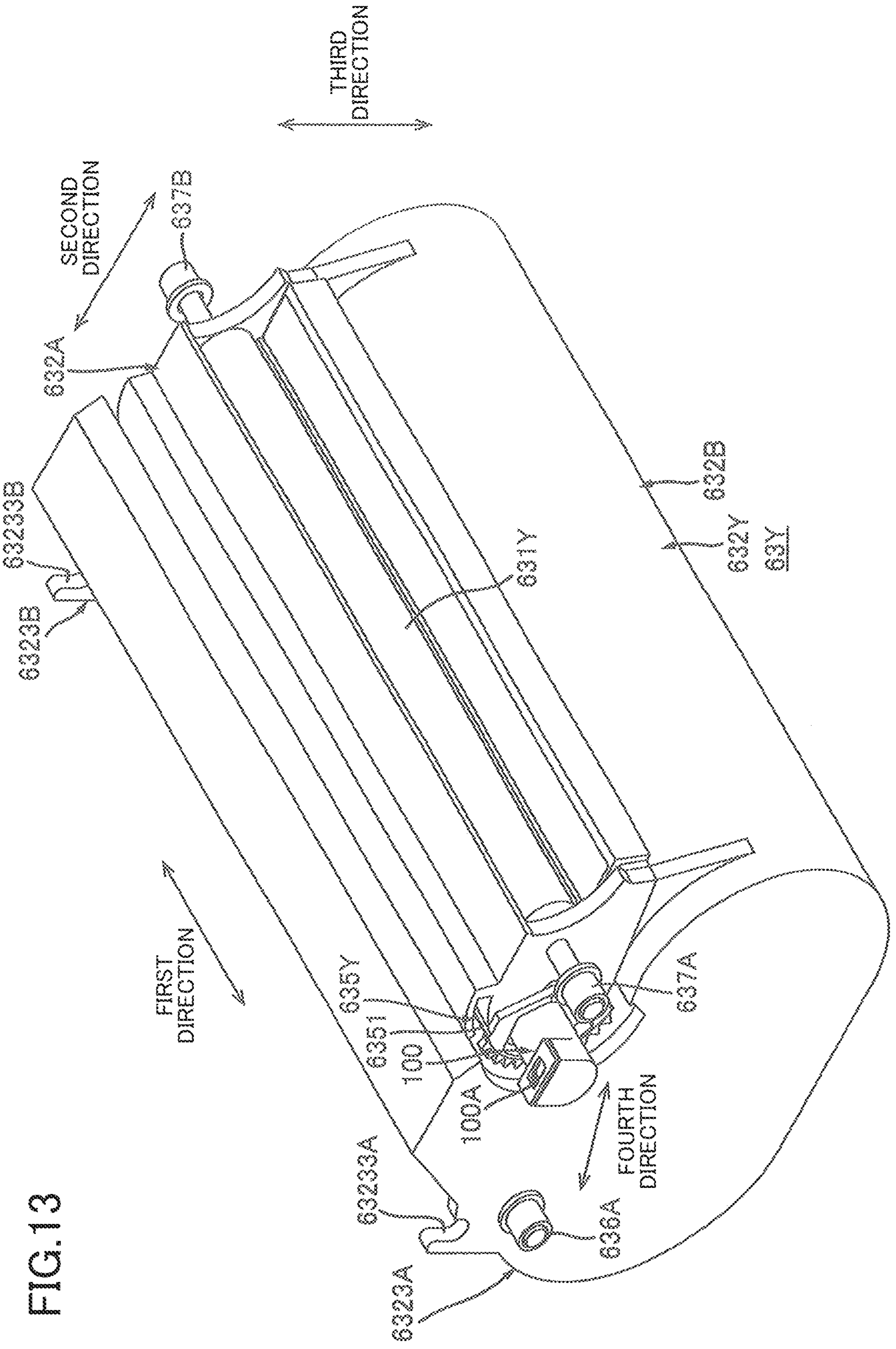
FIG. 13 is a perspective view of a developing unit.

As illustrated in FIG. 13, the developing unit 63Y may include a protruding portion 100. The protruding portion 100 is located at the first end of the first frame 632A in the first direction. The protruding portion 100 extends from the first end of the first frame 632A in the first direction. The protruding portion 100 extends in the first direction. The protruding portion 100 has a tubular shape. An inner space of the protruding portion 100 communicates with the inner space of the first frame 632A. The protruding portion 100 has an inlet 100A.

Figure 14:
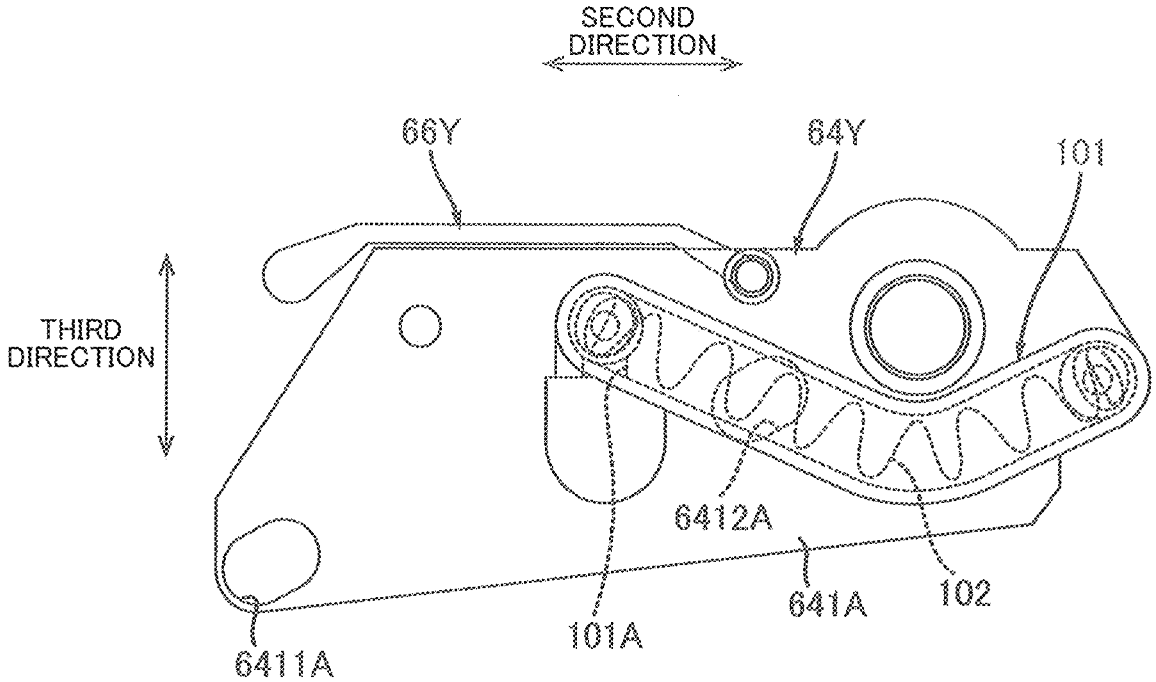
FIG. 14 is a side view of a drum frame illustrated in FIG. 13.

As illustrated in FIG. 14, the process cartridge 6Y includes a toner tube 101 and a collected toner conveying member 102.

The toner tube 101 allows collected toner to pass from the drum cleaner 65Y toward the protruding portion 100. The collected toner is toner removed from the circumferential surface of the photoconductive drum 61Y by the drum cleaner 65Y. A first end of the toner tube 101 is connected to the drum cleaner 65Y. A second end of the toner tube 101 is connected to the protruding portion 100. In other words, the toner tube 101 is connected to the developer housing 632Y. The toner tube 101 includes a discharge outlet 101A. The discharge outlet 101A is located at a second end of the toner tube 101. The discharge outlet 101A communicates with the inlet 100A.

The collected toner conveying member 102 is located in the toner tube 101 and in the drum cleaner 65Y. The collected toner conveying member 102 conveys the collected toner in the drum cleaner 65Y toward the discharge outlet 101A. The collected toner conveying member 102 is a shaft-less screw.

According to the present modification, it is possible to reuse the toner collected from the circumferential surface of the photoconductive drum 61Y in the developing operation.

In this case, there is a possibility that poor printing occurs due to a certain amount of uncharged toner contained in the collected toner.

However, the certain amount of uncharged toner is agitated and diluted when the toner is circulated among the first toner storage chamber 671, the second toner storage chamber 672 and the developer housing 632Y. Accordingly, it is possible to prevent an occurrence of the poor printing.

It is noted that, in the modification, it is possible to achieve the same effects as the above described embodiment.

The image forming apparatus 1 may not include the drawer 5. In this case, each of the process cartridges 6Y, 6M, 6C, 6K may be directly mountable on and removable from the image forming apparatus 1.

Moreover, in another aspect of the disclosure, an image forming apparatus may include a body housing, a process cartridge mountable in the body housing. The process cartridge may include a photoconductive drum rotatable around a drum axis extending in a first direction, a developing unit including a developing roller configured to supply toner to the photoconductive drum and a developer housing supporting the developing roller and capable of storing toner, the developer housing having a developer inlet through which toner is received, and a toner storage unit including a first toner storage chamber capable of storing toner, a second toner storage chamber located above the first toner storage chamber in the state in which the process cartridge is mounted on the image forming apparatus, the second toner storage chamber having a discharge outlet through which toner is discharged toward the developer inlet, a first toner conveying member located in the first toner storage chamber and configured to convey the toner in the first toner storage chamber upward toward the second toner storage chamber in an area wider than the toner discharge outlet in the first direction, and a second toner conveying member located in the second toner storage chamber and configured to convey, in the first direction, the toner in the second toner storage chamber toward the toner discharge outlet.

Moreover, in another aspect of the disclosure, a toner storage unit may be mountable on a drum cartridge. The drum cartridge may include a photoconductive drum rotatable around a drum axis extending in a first direction, and a developing unit including a developing roller configured to supply toner to the photoconductive drum, and a developer housing supporting the developing roller and capable of storing toner, the developer housing having a developer inlet through which toner is received. The toner storage unit may comprise a first toner storage chamber capable of storing toner, a second toner storage chamber located above the first toner storage chamber in the state in which the drum cartridge is mounted on the image forming apparatus, the second toner storage chamber having a toner discharge outlet through which toner is discharged toward the developer inlet, a first toner conveying member located in the first toner storage chamber and configured to convey the toner in the first toner storage chamber upward toward the second toner storage chamber in an area wider than the toner discharge outlet in the first direction, and a second toner conveying member located in the second toner storage chamber and configured to convey, in the first direction, the toner in the second toner storage chamber toward the toner discharge outlet.

In the image forming apparatus, the lock member may be located between the first toner storage unit and the second photoconductive drum in the state in which (i) the first toner storage unit is mounted on the first drum cartridge, (ii) the lock member is positioned at the lock position, and (iii) the first drum cartridge and the second drum cartridge are mounted on the drawer.

In the image forming apparatus, the first developing unit may include a developing roller configured to supply toner to the first photoconductive drum, and a developer housing supporting the developing roller and capable of storing toner supplied from the first toner storage unit, the developer housing having a developer inlet through which the toner supplied from the first toner storage unit is received. The developer housing may include a first frame having the developer inlet, and a second frame including a guide configured to guide the first toner storage unit when the first toner storage unit is replaced. The guide may extend in a direction directed from the first drum cartridge toward the second drum cartridge in the state in which (i) the first toner storage unit is mounted on the first drum cartridge, (ii) the lock member is positioned at the lock position, and (iii) the first drum cartridge and the second drum cartridge are mounted on the drawer.

In the image forming apparatus, the first developing unit may include a developing roller configured to supply toner to the first photoconductive drum, a developer housing supporting the developing roller and capable of storing toner supplied from the first toner storage unit, the developer housing having a developer inlet through which the toner supplied from the first toner storage unit is received, and a developer shutter movable between a developer closed position at which the developer shutter closes the developer inlet and a developer open position at which the developer inlet is open. In a state in which the first toner storage unit is mounted on the first developing unit, the developer shutter may move from the developer open position to the developer closed position along with a movement of the lock member from the lock position to the lock release position, and the developer shutter may move from the developer closed position to the developer open position along with a movement of the lock member from the lock release position to the lock position.

What is claimed is:

1. An image forming apparatus, comprising:

a body housing having an opening;

a drawer movable through the opening between an accommodated position at which the drawer is accommodated in the body housing and a drawn position at which the drawer is drawn to a position outside the body housing;

a first drum cartridge including a first photoconductive drum and a first developing unit configured to supply toner to the first photoconductive drum, the first drum cartridge being mounted on the drawer;

a first toner storage unit mounted on the first drum cartridge and capable of storing toner to be supplied to the first developing unit;

a second drum cartridge including a second photoconductive drum and a second developing unit configured to supply toner to the second photoconductive drum, the second drum cartridge being mounted on the drawer;

a second toner storage unit mounted on the second drum cartridge and capable of storing toner to be supplied to the second developing unit, wherein the first toner storage unit includes a first lock member movable between a lock position at which the first lock member locks the first toner storage unit to the first drum cartridge and a lock release position at which a lock between the first toner storage unit and the first drum cartridge is released in a state in which the first toner storage unit is mounted on the first drum cartridge, the first lock member including a first lock grip, wherein the second toner storage unit includes a second lock member movable between a lock position at which the second lock member locks the second toner storage unit to the second drum cartridge and a lock release position at which a lock between the second toner storage unit and the second drum cartridge is released in a state in which the second toner storage unit is mounted on the second drum cartridge, the second lock member including a second lock grip, wherein the first lock grip is located at a position lower than an upper end of the first toner storage unit in a state in which (i) the first toner storage unit is mounted on the first drum cartridge, (ii) the first lock member is positioned at the lock position, (iii) the first drum cartridge is mounted on the drawer, and (iv) the drawer is positioned at the accommodated position, and wherein the second lock grip is located at a position lower than an upper end of the second toner storage unit in a state in which (i) the second toner storage unit is mounted on the second drum cartridge, (ii) the second lock member is positioned at the lock position, (iii) the second drum cartridge is mounted on the drawer and (iv) the drawer is positioned at the accommodated position.

2. The image forming apparatus according to claim 1, wherein the first lock grip extends in a first direction in which a drum axis of the first photoconductive drum extends, and wherein the second lock grip extends in a second direction in which a drum axis of the second photoconductive drum extends.

3. The image forming apparatus according to claim 2, wherein the first lock member includes two first arms respectively connected to opposite ends of the first lock grip in the first direction, and wherein the second lock member includes two second arms respectively connected to opposite ends of the second lock grip in the second direction.

4. The image forming apparatus according to claim 3, wherein the first lock member includes two first engaging portions respectively connected to the two first arms, and wherein the second lock member includes two second engaging portions respectively connected to the two second arms.

5. An image forming apparatus, comprising:

a body housing having an opening;

a drawer movable through the opening between an accommodated position at which the drawer is accommodated in the body housing and a drawn position at which the drawer is drawn to a position outside the body housing;

a first drum cartridge including a first photoconductive drum and a first developing unit configured to supply toner to the first photoconductive drum, the first drum cartridge being mounted on the drawer;

a first toner storage unit mounted on the first drum cartridge and capable of storing toner to be supplied to the first developing unit;

a second drum cartridge including a second photoconductive drum and a second developing unit configured to supply toner to the second photoconductive drum, the second drum cartridge being mounted on the drawer;

a second toner storage unit mounted on the second drum cartridge and capable of storing toner to be supplied to the second developing unit, wherein the first toner storage unit includes a first lock member movable between a lock position at which the first lock member locks the first toner storage unit to the first drum cartridge and a lock release position at which a lock between the first toner storage unit and the first drum cartridge is released in a state in which the first toner storage unit is mounted on the first drum cartridge, the first lock member including a first lock grip, wherein the second toner storage unit includes a second lock member movable between a lock position at which the second lock member locks the second toner storage unit to the second drum cartridge and a lock release position at which a lock between the second toner storage unit and the second drum cartridge is released in a state in which the second toner storage unit is mounted on the second drum cartridge, the second lock member including a second lock grip, wherein the first drum cartridge includes a first handle gripped by a user when the user removes the first drum cartridge from the drawer, the first handle including a first handle grip, wherein the second drum cartridge includes a second handle gripped by the user when the user removes the second drum cartridge from the drawer, the second handle including a second handle grip, wherein the first handle grip is located at a position upper than the first lock grip in a state in which (i) the first toner storage unit is mounted on the first drum cartridge, (ii) the first lock member is positioned at the lock position and (iii) the first drum cartridge is mounted on the drawer, and wherein the second handle grip is located at a position upper than the second lock grip in a state in which (i) the second toner storage unit is mounted on the second drum cartridge, (ii) the second lock member is positioned at the lock position and (iii) the second drum cartridge is mounted on the drawer.

6. The image forming apparatus according to claim 5, wherein the first handle grip is located above the first lock grip in the state in which (i) the first toner storage unit is mounted on the first drum cartridge, (ii) the first lock member is positioned at the lock position, (iii) the first drum cartridge is mounted on the drawer, and wherein the second handle grip is located above the second lock grip in the state in which (i) the second toner storage unit is mounted on the second drum cartridge, (ii) the second lock member is positioned at the lock position, (iii) the second drum cartridge is mounted on the drawer.

7. The image forming apparatus according to claim 5, wherein the first lock grip extends in a first direction in which a drum axis of the first photoconductive drum extends, and wherein the second lock grip extends in a second direction in which a drum axis of the second photoconductive drum extends.

8. The image forming apparatus according to claim 7, wherein the first lock member includes two first arms respectively connected to opposite ends of the first lock grip in the first direction, and wherein the second lock member includes two second arms respectively connected to opposite ends of the second lock grip in the second direction.

9. The image forming apparatus according to claim 8, wherein the first lock member includes two first engaging portions respectively connected to the two first arms, and wherein the second lock member includes two second engaging portions respectively connected to the two second arms.

10. An image forming apparatus, comprising:

a body housing having an opening;

a drawer movable through the opening between an accommodated position at which the drawer is accommodated in the body housing and a drawn position at which the drawer is drawn to a position outside the body housing;

a first drum cartridge including a first photoconductive drum and a first developing unit configured to supply toner to the first photoconductive drum, the first drum cartridge being mounted on the drawer;

a first toner storage unit mounted on the first drum cartridge and capable of storing toner to be supplied to the first developing unit;

a second drum cartridge including a second photoconductive drum and a second developing unit configured to supply toner to the second photoconductive drum, the second drum cartridge being mounted on the drawer;

a second toner storage unit mounted on the second drum cartridge and capable of storing toner to be supplied to the second developing unit;

a third drum cartridge including a third photoconductive drum and a third developing unit configured to supply toner to the third photoconductive drum, the third drum cartridge being mounted on the drawer; and a third toner storage unit mounted on the third drum cartridge and capable of storing toner to be supplied to the third developing unit, wherein the first toner storage unit includes a first lock member movable between a lock position at which the first lock member locks the first toner storage unit to the first drum cartridge and a lock release position at which a lock between the first toner storage unit and the first drum cartridge is released in a state in which the first toner storage unit is mounted on the first drum cartridge, the first lock member including a first lock grip, wherein the second toner storage unit includes a second lock member movable between a lock position at which the second lock member locks the second toner storage unit to the second drum cartridge and a lock release position at which a lock between the second toner storage unit and the second drum cartridge is released in a state in which the second toner storage unit is mounted on the second drum cartridge, the second lock member including a second lock grip, wherein the first drum cartridge, the second drum cartridge and the third drum cartridge are arranged from an upstream side of a drawer-drawing direction in the order of the first drum cartridge, the second drum cartridge and the third drum cartridge, wherein the first lock member is located between the first toner storage unit and the second drum cartridge in a state in which (i) the first toner storage unit is mounted on the first drum cartridge, (ii) the first lock member is positioned at the lock position, and (iii) the first drum cartridge and the second drum cartridge are mounted on the drawer, and wherein the second lock member is located between the second toner storage unit and the third drum cartridge in a state in which (i) the second toner storage unit is mounted on the second drum cartridge, (ii) the second lock member is positioned at the lock position and (iii) the second drum cartridge and the third drum cartridge are mounted on the drawer.

11. The image forming apparatus according to claim 10, wherein the first lock member is located between the first toner storage unit and the second photoconductive drum in a state in which (i) the first toner storage unit is mounted on the first drum cartridge, (ii) the first lock member is positioned at the lock position and (iii) the first drum cartridge and the second drum cartridge are mounted on the drawer, and wherein the second lock member is located between the second toner storage unit and the third photoconductive drum in a state in which (i) the second toner storage unit is mounted on the second drum cartridge, (ii) the second lock member is positioned at the lock position (iii) and the second drum cartridge and the third drum cartridge are mounted on the drawer.

12. The image forming apparatus according to claim 10, wherein the first lock grip extends in a first direction in which a drum axis of the first photoconductive drum extends, and wherein the second lock grip extends in a second direction in which a drum axis of the second photoconductive drum extends.

13. The image forming apparatus according to claim 12, wherein the first lock member includes two first arms respectively connected to opposite ends of the first lock grip in the first direction, and wherein the second lock member includes two second arms respectively connected to opposite ends of the second lock grip in the second direction.

14. The image forming apparatus according to claim 13, wherein the first lock member includes two first engaging portions respectively connected to the two first arms, and wherein the second lock member includes two second engaging portions respectively connected to the two second arms.

* * * * *